United States Patent
Qiao

(10) Patent No.: US 11,679,487 B2
(45) Date of Patent: Jun. 20, 2023

(54) BATTERY PACK AND ELECTRIC TOOL ASSEMBLY

(71) Applicant: Positec Power Tools (Suzhou) Co., Ltd, Suzhou (CN)

(72) Inventor: Yong Qiao, Suzhou (CN)

(73) Assignee: Positec Power Tools (Suzhou) Co., Ltd, Suzhou (CN)

(*) Notice: Subject to any disclaimer, the term of this patent is extended or adjusted under 35 U.S.C. 154(b) by 370 days.

(21) Appl. No.: 16/649,390

(22) PCT Filed: Sep. 25, 2018

(86) PCT No.: PCT/CN2018/107226
§ 371 (c)(1),
(2) Date: Mar. 20, 2020

(87) PCT Pub. No.: WO2019/057187
PCT Pub. Date: Mar. 28, 2019

(65) Prior Publication Data
US 2020/0251696 A1    Aug. 6, 2020

(30) Foreign Application Priority Data
Sep. 22, 2017 (CN) .......................... 201710866416.5

(51) Int. Cl.
*H01M 50/296* (2021.01)
*B25F 5/02* (2006.01)
(Continued)

(52) U.S. Cl.
CPC ............ *B25F 5/02* (2013.01); *H01M 50/271* (2021.01); *H01M 50/296* (2021.01); *H01M 50/213* (2021.01); *H01M 2220/30* (2013.01)

(58) Field of Classification Search
CPC ............ H01M 50/213; H01M 50/543; H01M 2220/30; H01M 10/425; H01M 50/207;
(Continued)

(56) References Cited

U.S. PATENT DOCUMENTS 8,563,163 B2 * 10/2013 Hayashi ................ H01M 50/20
429/163
2010/0092850 A1 * 4/2010 Ueda ................... H01M 50/213
429/99
(Continued)

FOREIGN PATENT DOCUMENTS

CN        102637838 A    8/2012
CN        204424329 U    6/2015
(Continued)

*Primary Examiner* — Michael L Dignan
(74) *Attorney, Agent, or Firm* — Dentons US LLP

(57) ABSTRACT

The invention relates to a battery pack, including: a battery pack cover; a battery pack base; a cell group including several cells; a battery terminal connector; a mounting cavity, the mounting cavity being formed with a socket for inserting housing terminals to be electrically connected to battery pack terminals; a locking apparatus, capable of driving the battery pack and an electric tool be locked connection or released, a seal member blocking a passage from the socket to the cell group is disposed inside the mounting cavity; the battery pack includes a battery pack housing seal member blocking communication between the outside and the mounting cavity, and the battery pack housing seal member is disposed at a joint between the battery pack cover and the battery pack base; and the locking apparatus is mounted on a battery pack housing and isolated outside the mounting cavity.

14 Claims, 21 Drawing Sheets

(51) Int. Cl.
*H01M 50/271* (2021.01)
*H01M 50/213* (2021.01)

(58) Field of Classification Search
CPC .. H01M 50/24; H01M 50/247; H01M 50/262; H01M 50/271; H01M 50/548; H01M 50/20; B25F 5/02; B25F 5/00; Y02E 60/10
See application file for complete search history.

(56) References Cited

U.S. PATENT DOCUMENTS

| | | | | |
|---|---|---|---|---|
| 2012/0114998 | A1* | 5/2012 | Hwang | H01M 50/213 |
| | | | | 429/99 |
| 2015/0064539 | A1* | 3/2015 | Kim | H01M 50/291 |
| | | | | 429/149 |
| 2015/0079434 | A1* | 3/2015 | Zahn | H01M 10/653 |
| | | | | 429/71 |
| 2015/0214520 | A1* | 7/2015 | Nishikawa | H01M 50/20 |
| | | | | 429/100 |
| 2016/0151799 | A1* | 6/2016 | Reale | B05B 9/0416 |
| | | | | 239/526 |
| 2019/0067655 | A1* | 2/2019 | Nakamura | H01M 50/502 |
| 2019/0237716 | A1* | 8/2019 | Sperl | H01M 50/543 |

FOREIGN PATENT DOCUMENTS

| | | |
|---|---|---|
| CN | 105405994 A | 3/2016 |
| CN | 206148487 U | 5/2017 |
| EP | 2 421 071 A1 | 2/2012 |
| KR | 20160019698 A | 2/2016 |
| WO | 2014/027439 A2 | 2/2014 |
| WO | 2017/084633 A1 | 5/2017 |

* cited by examiner

BATTERY PACK AND ELECTRIC TOOL ASSEMBLY

This application is a National Stage application of International Application No. PCT/CN2018/107226, filed Sep. 25, 2018, a claims priority to Chinese Application No. 201710866416.5, filed Sep. 22, 2017, which is hereby incorporated by reference in its entirety as if fully set forth herein.

BACKGROUND

Technical Field

The present invention relates to a battery pack and an electric tool assembly, and in particular, to a waterproof seal structure for a battery pack and an electric tool assembly.

Related Art

Nowadays, in the industry of gardening machinery and power tools, electric tools using alternating current power are restricted by power supplies. Corresponding alternating-current power supplies need to be configured in use scenarios of such electric tools, causing more inconvenience during application in outdoor scenarios. In addition, an electric tool using alternating-current power is restricted by the length of a power cable, and can be used only inside a length range of the power cable. As a result, the use range and mobility of an electric tool are limited.

Therefore, power electric tools powered by battery packs become the prevailing trend. However, gardening machinery and power tools are usually used in complex working conditions. During use or storage, especially use in damp or water-related environments, it is almost inevitable that water enters a mounting cavity of a battery pack through a water inlet path on the battery pack. The service life of components may be compromised or even a fire may be started, and corresponding safety requirements are violated. Therefore, it is necessary to design a waterproof battery pack to resolve the foregoing problem.

SUMMARY

In view of this, the technical problem to be resolved by the present invention is to provide a battery pack that has a simple structure and can ensure that a direct-current electric tool can satisfy particular waterproofing standards.

To achieve the foregoing objective, the technical solution used in the present invention is as follows:

A battery pack is detachably attached to an electric tool provided with housing terminals, the battery pack including:

a battery pack cover;

a battery pack base, joined to the battery pack cover to form a battery pack housing;

a cell group, configured to charged and discharged, the cell group including several cells, and each cell being provided with a cell body portion, a first electrode terminal located on one side of the cell body portion, and a second electrode terminal located on the other side of the cell body portion;

a battery terminal connector, electrically connected to the cell group, the battery terminal connector including battery pack terminals electrically connectable to the housing terminals and a terminal base supporting the battery pack terminals;

a mounting cavity, defined in the battery pack housing, and accommodating the cell group and the battery terminal connector, the mounting cavity being formed with a socket for inserting the housing terminals to be electrically connected to the battery pack terminals; and a locking apparatus, capable of driving the battery pack and the electric tool to be locked connection or released, wherein a seal member blocking a passage from the socket to the cell group is disposed inside the mounting cavity;

the battery pack further includes a battery pack housing seal member blocking communication between the outside and the mounting cavity, and the battery pack housing seal member is disposed at a joint between the battery pack cover and the battery pack base; and the locking apparatus is mounted on the battery pack housing, and the locking apparatus is isolated outside the mounting cavity.

In an embodiment, the seal member is tightly pressed between the socket and the terminal base.

In an embodiment, a thickness of the seal member in a free state is greater than a gap between the terminal base and the socket.

In an embodiment, the socket is attached with the seal member, the seal member attached to the socket is disposed on an inner wall of the battery pack, the seal member is provided with a through hole, and the through hole is configured to have a structure that does not prevent the seal member from isolating the socket from the cell group for the housing terminals to pass through.

In an embodiment, the seal member and the battery terminal connector that are located in the mounting cavity are disposed opposite each other.

In an embodiment, the terminal base is constructed to be a waterproof box body, the waterproof box body is provided, in a direction facing the socket, with an opening for the housing terminals to pass through, and the seal member is sealed between an inner wall of the battery pack and the waterproof box body, to close an assembly gap between the waterproof box body and the inner wall of the battery pack.

In an embodiment, a maximum sectional area of the waterproof box body in a joint direction of the battery pack cover and the battery pack base is greater than a sectional area of the socket in the joint direction.

In an embodiment, the seal member is one or a combination of a flexible seal washer, an encapsulated adhesive, a waterproof bonding agent, and a melt formed through welding pressed between the waterproof box body and the inner wall of the battery pack.

In an embodiment, the seal member is a separating member disposed between the battery terminal connector and the cell group, and the cell group is located in a space defined by the separating member and an inner wall of the battery pack housing.

In an embodiment, the locking apparatus is detachably mounted on the battery pack cover and is movable relative to the battery pack cover, to enable the battery pack and the electric tool to be locked connection or released.

In an embodiment, the battery pack housing is provided with a retaining cavity that is concave in an outer surface of the battery pack housing and at least partially surrounds the locking apparatus, the retaining cavity forms a movement space for the locking apparatus to move, and the retaining cavity and the mounting cavity are not in communication with each other.

In an embodiment, the battery pack includes an isolation member detachably connected to the battery pack housing and an isolation seal structure located between the isolation member and the battery pack housing, and the isolation member is concavely provided with a retaining cavity for accommodating the locking apparatus.

In view of this, the technical problem to be resolved by the present invention is to provide an electric tool assembly that has a simple structure and can ensure that a direct-current electric tool can satisfy particular waterproofing standards.

To achieve the foregoing objective, the technical solution used in the present invention is as follows:

An electric tool assembly includes a battery pack and an electric tool detachably connected to the battery pack, the battery pack including:

a battery pack cover;

a battery pack base, joined to the battery pack cover to form a battery pack housing;

a cell group, configured to charged and discharged, the cell group including several cells, and each cell being provided with a cell body portion, a first electrode terminal located on one side of the cell body portion, and a second electrode terminal located on the other side of the cell body portion;

a battery terminal connector, electrically connected to the cell group, the battery terminal connector including battery pack terminals electrically connectable to a housing terminals and a terminal base supporting the battery pack terminals;

a mounting cavity, defined in the battery pack housing, and accommodating the cell group and the battery terminal connector, the mounting cavity being formed with a socket for inserting the housing terminals to be electrically connected to the battery pack terminals; and a locking apparatus, capable of driving the battery pack and the electric tool to be locked connection or released; and the electric tool including:

a housing;

a tool terminal connector, connected to the housing, the tool terminal connector including the housing terminals and a base supporting the housing terminals;

a functional member, having a motor providing a driving force to the electric tool;

a seal member blocking a passage from the socket to the cell group is disposed inside the mounting cavity;

the battery pack further includes a battery pack housing seal member blocking communication between the outside and the mounting cavity, and the battery pack housing seal member is disposed at a joint between the battery pack cover and the battery pack base; and the locking apparatus is mounted on the battery pack housing, and the locking apparatus is isolated outside the mounting cavity.

In an embodiment, the seal member is tightly pressed between the socket and the terminal base.

In an embodiment, a thickness of the seal member in a free state is greater than a gap between the terminal base and the socket.

In an embodiment, the socket is attached with the seal member, the seal member attached to the socket is disposed on an inner wall of the battery pack, the seal member is provided with a through hole, and the through hole is configured to have a structure that does not prevent the seal member from isolating the socket from the cell group for the housing terminals to pass through.

In an embodiment, the seal member and the battery terminal connector that are located in the mounting cavity are disposed opposite each other.

In an embodiment, the terminal base is constructed to be a waterproof box body, the waterproof box body is provided, in a direction facing the socket, with an opening for the housing terminals to pass through, and the seal member is sealed between an inner wall of the battery pack and the waterproof box body, to close an assembly gap between the waterproof box body and the inner wall of the battery pack.

In an embodiment, a maximum sectional area of the waterproof box body in a joint direction of the battery pack cover and the battery pack base is greater than a sectional area of the socket in the joint direction.

In an embodiment, the seal member is one or a combination of a flexible seal washer, an encapsulated adhesive, a waterproof bonding agent, and a melt formed through welding pressed between the waterproof box body and the inner wall of the battery pack.

In an embodiment, the seal member is a separating member disposed between the battery terminal connector and the cell group, and the cell group is located in a space defined by the separating member and an inner wall of the battery pack housing.

In an embodiment, the locking apparatus is detachably mounted on the battery pack cover and is movable relative to the battery pack cover, to enable the battery pack and the electric tool to be locked connection or released.

In an embodiment, the battery pack housing is provided with a retaining cavity that is concave in an outer surface of the battery pack housing and at least partially surrounds the locking apparatus, the retaining cavity forms a movement space for the locking apparatus to move, and the retaining cavity and the mounting cavity are not in communication with each other.

In an embodiment, the battery pack includes an isolation member detachably connected to the battery pack housing and an isolation seal structure located between the isolation member and the battery pack housing, and the isolation member is concavely provided with a retaining cavity for accommodating the locking apparatus.

In an embodiment, the electric tool is a high-pressure cleaner, and the housing includes a handle for holding, a body portion disposed at an angle from the handle, a water inlet connected to an external water source, and a water outlet for discharging water.

In an embodiment, the body portion is disposed at one end of the handle, and the battery pack is disposed at the other end of the handle.

In an embodiment, the functional member includes a pump driven by the motor to discharge water, and the functional member is disposed in the housing.

In an embodiment, a working water pressure at which the high-pressure cleaner discharges water is 0.3 Mpa to 5 Mpa.

In an embodiment, one or more battery packs are configured, and a voltage of each battery pack is 18 V to 42 V.

In view of this, the technical problem to be resolved by the present invention is to provide an electric tool assembly that has a simple structure and can ensure that a direct-current electric tool can satisfy particular waterproofing standards.

To achieve the foregoing objective, the technical solution used in the present invention is as follows:

An electric tool assembly includes an electric tool and a battery pack electrically connected to the electric tool, the electric tool including:

a housing;

a tool terminal connector, connected to the housing, the tool terminal connector including a housing terminals and a base supporting the housing terminals;

a functional member, having a motor providing a driving force to the electric tool;

the battery pack, detachably coupled to the housing, the battery pack including:

a battery pack cover;

a battery pack base, joined to the battery pack cover to form a battery pack housing;

a cell group, configured to charged and discharged, the cell group including several cells, and each cell being provided with a cell body portion, a first electrode terminal located on one side of the cell body portion, and a second electrode terminal located on the other side of the cell body portion;

a battery terminal connector, electrically connected to the cell group, the battery terminal connector including battery pack terminals electrically connectable to the housing terminals and a terminal base supporting the battery pack terminals; and a mounting cavity, defined in the battery pack housing, and accommodating the cell group and the battery terminal connector, where the battery pack includes a waterproof structure wrapped around at least a part of the cell group, the waterproof structure includes a first waterproof body wrapping the first electrode terminal of each cell and a second waterproof body wrapping the second electrode terminal of each cell, and the battery pack base is provided with a drainage hole that enables the mounting cavity to be in communication with the outside.

In an embodiment, the first waterproof body and the second waterproof body may be waterproof layers formed in an encapsulated manner, and the waterproof layers are bonded to outer surfaces of the first electrode terminal and the second electrode terminal.

In an embodiment, the first waterproof body and the second waterproof body may be sealed cases, and the first electrode terminal and the second electrode terminal are accommodated in inner cavities of the sealed cases.

In an embodiment, the battery pack further includes a bonding adhesive sealed at the sealed cases, the first electrode terminal, and the second electrode terminal.

In an embodiment, the waterproof structure further includes a third waterproof body wrapping each cell body portion.

In an embodiment, the first waterproof body, the second waterproof body, and the third waterproof body are integrally formed into an independent overall structure, and the independent overall structure is completely wrapped around the cell group.

In an embodiment, the electric tool is a high-pressure cleaner, and the housing includes a handle for holding, a body portion disposed at an angle from the handle, a water inlet connected to an external water source, and a water outlet for discharging water.

In an embodiment, the body portion is disposed at one end of the handle, and the battery pack is disposed at the other end of the handle.

In an embodiment, the functional member further includes a pump driven by the motor to discharge water, and the functional member is disposed in the housing.

In an embodiment, a working water pressure at which the high-pressure cleaner discharges water is 0.3 Mpa to 5 Mpa.

In an embodiment, one or more battery packs are configured, and a voltage of each battery pack is 18 V to 42 V.

In view of this, the technical problem to be resolved by the present invention is to provide an electric tool assembly that has a simple structure and can ensure that a direct-current electric tool can satisfy particular waterproofing standards.

To achieve the foregoing objective, the technical solution used in the present invention is as follows:

An electric tool assembly, including an electric tool and a battery pack electrically connected to the electric tool, the electric tool including:

a housing, including a first half housing and a second half housing that are joined to each other and an accommodating cavity that is defined in the housing;

a tool electrical device, disposed in the housing, the tool electrical device including a motor providing a driving force to the electric tool, a control board, and a switch disposed in the housing, the switch controlling the motor to work, and a control program being embedded in the control board and being configured to control a power supply status of the battery pack;

a pump, driven by the motor, the pump including a pump body, a plunger disposed in the pump body, a water inlet and a water outlet that are disposed on the pump body, and a central chamber for the plunger to reciprocate;

a water outlet pipe, accommodated in the housing, and having a water outlet in communication with the water outlet of the pump;

a tool terminal connector, connected to the housing, the tool terminal connector including housing terminals and a base supporting the housing terminals; and the battery pack, detachably coupled to the housing, the battery pack including:

a battery pack cover;

a battery pack base, joined to the battery pack cover to form a battery pack housing;

a cell group, configured to charged and discharged, the cell group including several cells, and each cell being provided with a cell body portion, a first electrode terminal located on one side of the cell body portion, and a second electrode terminal located on the other side of the cell body portion;

a battery terminal connector, electrically connected to the cell group, the battery terminal connector including battery pack terminals electrically connectable to the housing terminals and a terminal base supporting the battery pack terminals;

a mounting cavity, defined in the battery pack housing, and accommodating the cell group and the battery terminal connector, the mounting cavity being formed with a socket for inserting the housing terminals to be electrically connected to the battery pack terminals; and a locking apparatus, capable of driving the battery pack and the electric tool to be locked connection or released, where the housing is provided with a main housing seal member blocking a passage from a joint gap between the first half housing and the second half housing to the accommodating cavity of the housing, a water outlet seal member isolating a passage between the water outlet and the tool electrical device, and a tool terminal connector seal member blocking a passage from an assembly gap between the tool terminal connector and the housing to the accommodating cavity;

when the battery pack is coupled to the electric tool, a fitting gap exists between the electric tool and the battery pack, and at least one of the electric tool and the battery pack is configured with a socket seal member blocking a passage from the fitting gap to the socket;

the battery pack further includes a battery pack housing seal member blocking communication between the outside and the mounting cavity, and the battery pack housing seal member is disposed at a joint between the battery pack cover and the battery pack base; and the locking apparatus is mounted on the battery pack housing, and the locking apparatus is isolated outside the mounting cavity.

In an embodiment, the tool terminal connector is provided with a butting surface, the housing terminals at least partially protrudes outside the butting surface, the battery pack includes a fitting surface that can butt against and fit the butting surface, and the socket is formed on the fitting surface.

In an embodiment, the socket seal member is disposed between the butting surface and the fitting surface.

In an embodiment, the electric tool is a high-pressure cleaner, the housing includes a handle for holding, a body portion disposed at an angle from the handle, and a water inlet that is connected to an external water source and is in communication with the water outlet.

In an embodiment, the body portion is disposed at one end of the handle, and the battery pack is disposed at the other end of the handle.

In an embodiment, the motor and the pump are disposed in the body portion.

In an embodiment, a working water pressure at which the high-pressure cleaner discharges water is 0.3 Mpa to 5 Mpa.

In an embodiment, one or more battery packs are configured, and a voltage of each battery pack is 18 V to 60 V.

In view of this, the technical problem to be resolved by the present invention is to provide an electric tool assembly that has a simple structure and can ensure that a direct-current electric tool can satisfy particular waterproofing standards.

To achieve the foregoing objective, the technical solution used in the present invention is as follows:

An electric tool assembly, including an electric tool and a battery pack electrically connected to the electric tool, the electric tool including:

a housing, including a first half housing and a second half housing that are joined to each other and an accommodating cavity that is defined in the housing;

a tool electrical device, disposed in the housing, the tool electrical device including a motor providing a driving force to the electric tool, a control board, and a switch disposed in the housing, the switch controlling the motor to work, and a control program being embedded in the control board and being configured to control a power supply status of the battery pack;

a pump, driven by the motor, the pump including a pump body, a plunger disposed in the pump body, a water inlet and a water outlet that are disposed on the pump body, and a central chamber for the plunger to reciprocate;

a water outlet pipe, accommodated in the housing, and having a water outlet in communication with the water outlet of the pump;

a tool terminal connector, connected to the housing, the tool terminal connector including housing terminals and a base supporting the housing terminals; and the battery pack detachably coupled to the housing, the battery pack including:

a battery pack cover;

a battery pack base, joined to the battery pack cover to form a battery pack housing;

a charged body, including a cell group configured to charged and discharged and a battery terminal connector electrically connected to the cell group, the cell group including several cells, and each cell being provided with a cell body portion, a first electrode terminal located on one side of the cell body portion, and a second electrode terminal located on the other side of the cell body portion, and the battery terminal connector including battery pack terminals electrically connectable to the housing terminals and a terminal base supporting the battery pack terminals;

a mounting cavity, defined in the battery pack housing, and accommodating the cell group and the battery terminal connector, the mounting cavity being formed with a socket for inserting the housing terminals to be electrically connected to the battery pack terminals;

and a locking apparatus, capable of driving the battery pack and the electric tool to be locked connection or released, where the housing is provided with a main housing seal member blocking a passage from a joint gap between the first half housing and the second half housing to the accommodating cavity of the housing, a water outlet seal member isolating a passage between the water outlet and the tool electrical device, and a tool terminal connector seal member blocking a passage from an assembly gap between the tool terminal connector and the housing to the accommodating cavity;

when the battery pack is coupled to the electric tool, a fitting gap exists between the electric tool and the battery pack, and at least one of the electric tool and the battery pack is configured with a socket seal member blocking a passage from the fitting gap to the socket; and the battery pack further includes a waterproof structure completely wrapped around the charged body.

In an embodiment, the waterproof structure is a waterproof layer formed in an encapsulated manner, a waterproof tape wrapped around the cell group or a sealed case accommodated in the mounting cavity.

In an embodiment, the electric tool is a high-pressure cleaner, the housing includes a handle for holding, a body portion disposed at an angle from the handle, and a water inlet that is connected to an external water source and is in communication with the water outlet.

In an embodiment, the body portion is disposed at one end of the handle, and the battery pack is disposed at the other end of the handle.

In an embodiment, the motor and the pump are disposed in the body portion.

In an embodiment, a working water pressure at which the high-pressure cleaner discharges water is 0.3 Mpa to 5 Mpa.

In an embodiment, one or more battery packs are configured, and a voltage of each battery pack is 18 V to 60 V.

In view of this, the technical problem to be resolved by the present invention is to provide an electric tool assembly that has a simple structure and can ensure that a direct-current electric tool can satisfy particular waterproofing standards.

To achieve the foregoing objective, the technical solution used in the present invention is as follows:

An electric tool assembly, including an electric tool and a battery pack electrically connected to the electric tool, the electric tool including:

a housing, including a first half housing and a second half housing that are joined to each other and an accommodating cavity that is defined in the housing;

a tool electrical device, disposed in the accommodating cavity, the tool electrical device including a motor providing a driving force to the electric tool, a control board, and a switch disposed in the housing, the switch controlling the motor to work, and a control program being embedded in the control board and being configured to control a power supply status of the battery pack;

a pump, driven by the motor, the pump including a pump body, a plunger disposed in the pump body, a water inlet and a water outlet that are disposed on the pump body, and a central chamber for the plunger to reciprocate;

a water outlet pipe, accommodated in the housing, and having a water outlet in communication with the water outlet of the pump;

a tool terminal connector, connected to the housing, the tool terminal connector including housing terminals and a base supporting the housing terminals;

the battery pack is configured to be a built-in battery accommodated in the accommodating cavity;

the housing is provided with a main housing seal member blocking a passage from a joint gap between the first half housing and the second half housing to the accommodating cavity and a water outlet seal member isolating a passage between the water outlet and the tool electrical device.

In an embodiment, the housing further includes a waterproof charging interface electrically connected to the built-in battery.

In an embodiment, the electric tool assembly further includes a wireless charger, and the wireless charger can be inductively coupled to the built-in battery to charge the built-in battery.

In an embodiment, the electric tool is a high-pressure cleaner, the housing includes a handle for holding, a body portion disposed at an angle from the handle, and a water inlet that is connected to an external water source and is in communication with the water outlet.

In an embodiment, the body portion is disposed at one end of the handle, and the battery pack is disposed at the other end of the handle.

In an embodiment, the motor and the pump are disposed in the body portion.

In an embodiment, a working water pressure at which the high-pressure cleaner discharges water is 0.3 Mpa to 5 Mpa.

In an embodiment, one or more battery packs are configured, and a voltage of each battery pack is 18 V to 60 V.

In view of this, the technical problem to be resolved by the present invention is to provide an electric tool assembly that has a simple structure and can ensure that a direct-current electric tool can satisfy particular waterproofing standards.

To achieve the foregoing objective, the technical solution used in the present invention is as follows:

An electric tool assembly, including an electric tool and a battery pack electrically connected to the electric tool, the electric tool including:

a housing, including a first half housing and a second half housing that are joined to each other and an accommodating cavity that is defined in the housing;

a tool electrical device, including a motor providing a driving force to the electric tool, a control board, and a switch disposed in the housing, the switch controlling the motor to work, and a control program being embedded in the control board and being configured to control a power supply status of the battery pack;

a pump, driven by the motor, the pump including a pump body, a plunger disposed in the pump body, a water inlet and a water outlet that are disposed on the pump body, and a central chamber for the plunger to reciprocate;

a water outlet pipe, accommodated in the housing, and having a water outlet in communication with the water outlet of the pump; and a tool terminal connector, connected to the housing, the tool terminal connector including housing terminals and a base supporting the housing terminals, where the battery pack is configured to be a built-in battery accommodated in the accommodating cavity, the electric tool assembly further includes a waterproof sealed box body disposed in the housing, and the tool electrical device and the built-in battery are both accommodated in the waterproof sealed box body.

In an embodiment, the electric tool is a high-pressure cleaner, the housing includes a handle for holding, a body portion disposed at an angle from the handle, and a water inlet that is connected to an external water source and is in communication with the water outlet.

In an embodiment, the body portion is disposed at one end of the handle, and the battery pack is disposed at the other end of the handle.

In an embodiment, the motor and the pump are disposed in the body portion.

In an embodiment, a working water pressure at which the high-pressure cleaner discharges water is 0.3 Mpa to 5 Mpa.

In an embodiment, one or more battery packs are configured, and a voltage of each battery pack is 18 V to 60 V.

BRIEF DESCRIPTION OF THE DRAWINGS

The foregoing objectives, technical solutions, and beneficial effects of the present invention may be clearly obtained by using the following detailed description of specific embodiments that can implement the present invention with reference to the description of the drawings.

The same reference numerals and symbols in the accompanying drawings and specification are used to represent the same or equivalent components.

DETAILED DESCRIPTION

Figure 1:
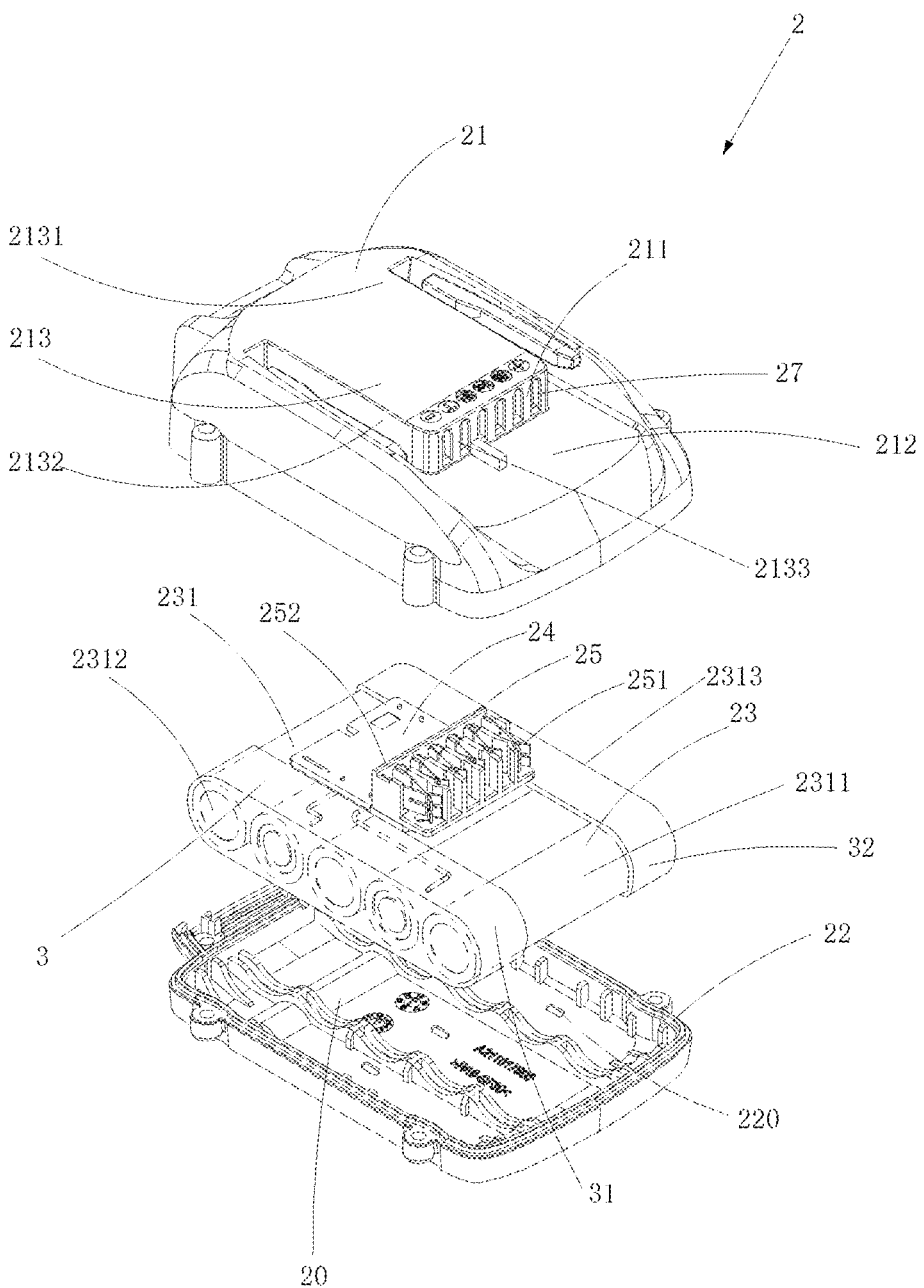
FIG. 1 is a partial structural exploded view of a battery pack in a corresponding condition in a first implementation of waterproofing a battery pack according to the present invention.

The preferred embodiments of the present invention are described below in detail with reference to the accompanying drawings to make the advantages and features of the present invention more comprehensible to a person skilled in the art, so as to define more clearly the scope of protection of the present invention. The same reference numerals are used for the same component in different embodiments.

As shown in FIG. 10, FIG. 11, FIG. 13, and FIG. 14, a high-pressure cleaner assembly 100 is disclosed. The high-pressure cleaner assembly 100 includes a high-pressure cleaner 1 and an energy unit electrically connected to the high-pressure cleaner 1. The energy unit is a direct-current power supply. Specifically, the direct-current power supply may be a battery pack 2.

Figure 9:
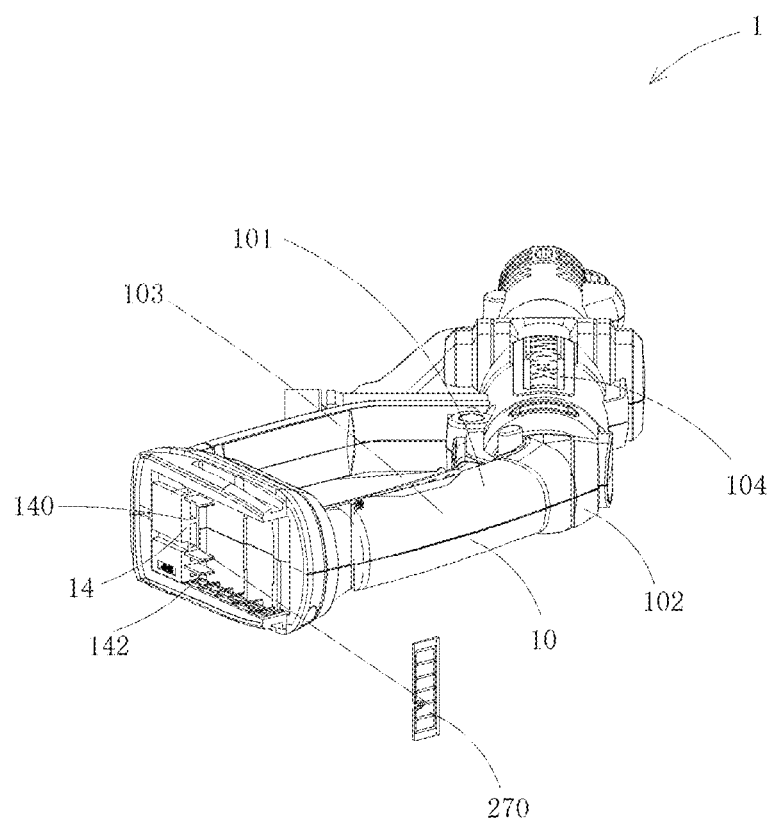
FIG. 9 is a perspective view of a handheld high-pressure cleaner according to the present invention.
Figure 11:
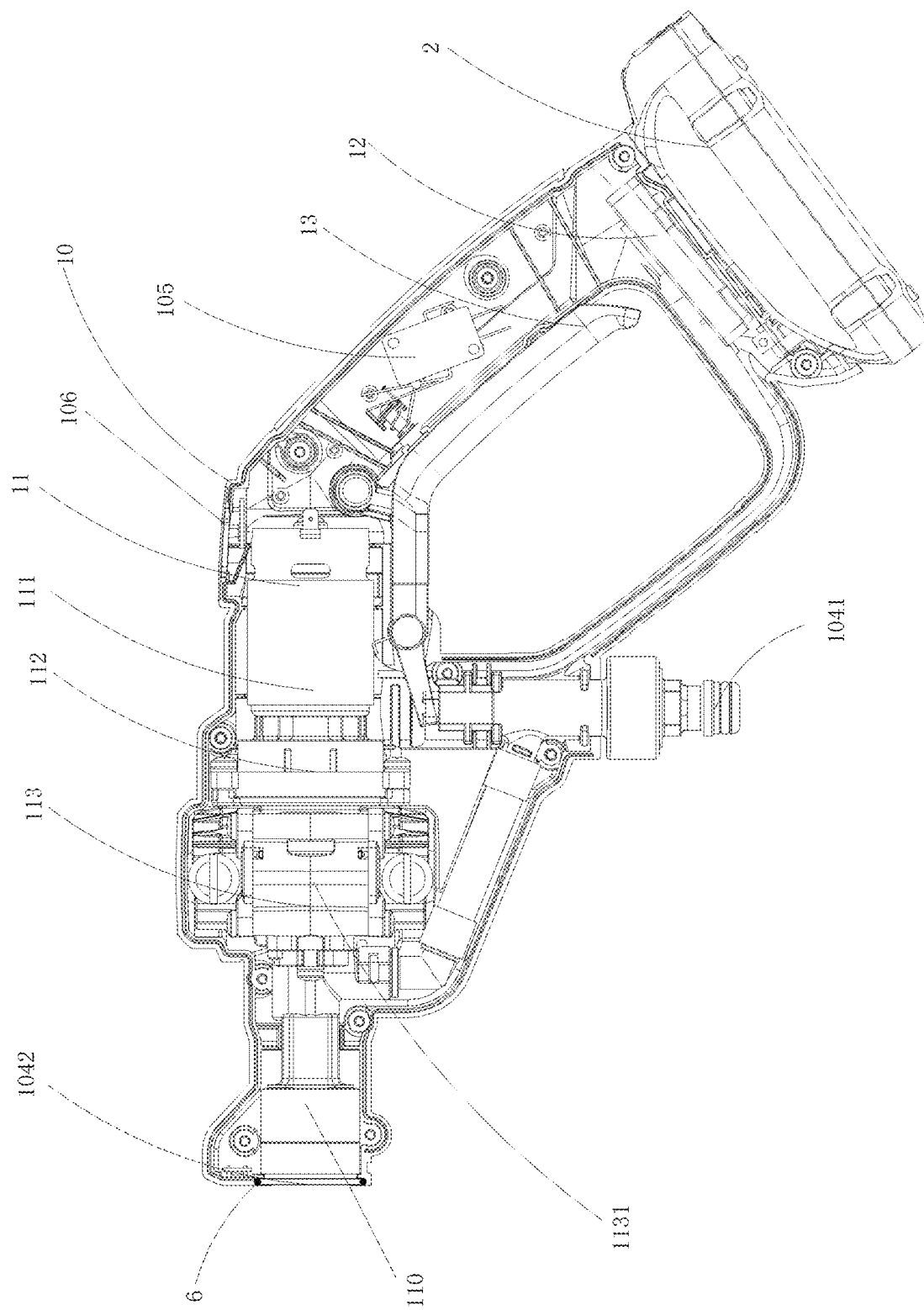
FIG. 11 is a schematic view of the handheld high-pressure cleaner and the battery pack in FIG. 10 being coupled with a half housing removed.

As shown in FIG. 9 and FIG. 11, the high-pressure cleaner 1 includes a housing 10, a tool electrical device 11 disposed in the housing 10, and a trigger 13. The tool electrical device 11 includes a motor 111 providing a driving force to the high-pressure cleaner 1, a control board 12, a switch 105 disposed in the housing 10, and a plurality of wires connecting the foregoing electrical devices. The motor 111 and the battery pack 2 are both electrically connected to the control board 12. The control board 12 is disposed above a connection between the housing 10 and the battery pack 2. The trigger 13 may operably fit the switch 105 to control the motor 111 to work. A control program is embedded in the control board 12 and may be used to control a power supply status of the battery pack 2, whether the motor 111 rotates, and the change of a rotational speed of the motor 111.

The high-pressure cleaner 1 further includes a transmission mechanism 112 connected to the motor 111 and a pump 113 driven by the transmission mechanism 112. The transmission mechanism 112 is configured to convert the rotation of the motor 111 into the reciprocation of the pump 113. The motor 111, the transmission mechanism 112, and the pump 113 form a functional member of the high-pressure cleaner 1. Specifically, the transmission mechanism 112 is a gear reduction mechanism.

Figure 10:
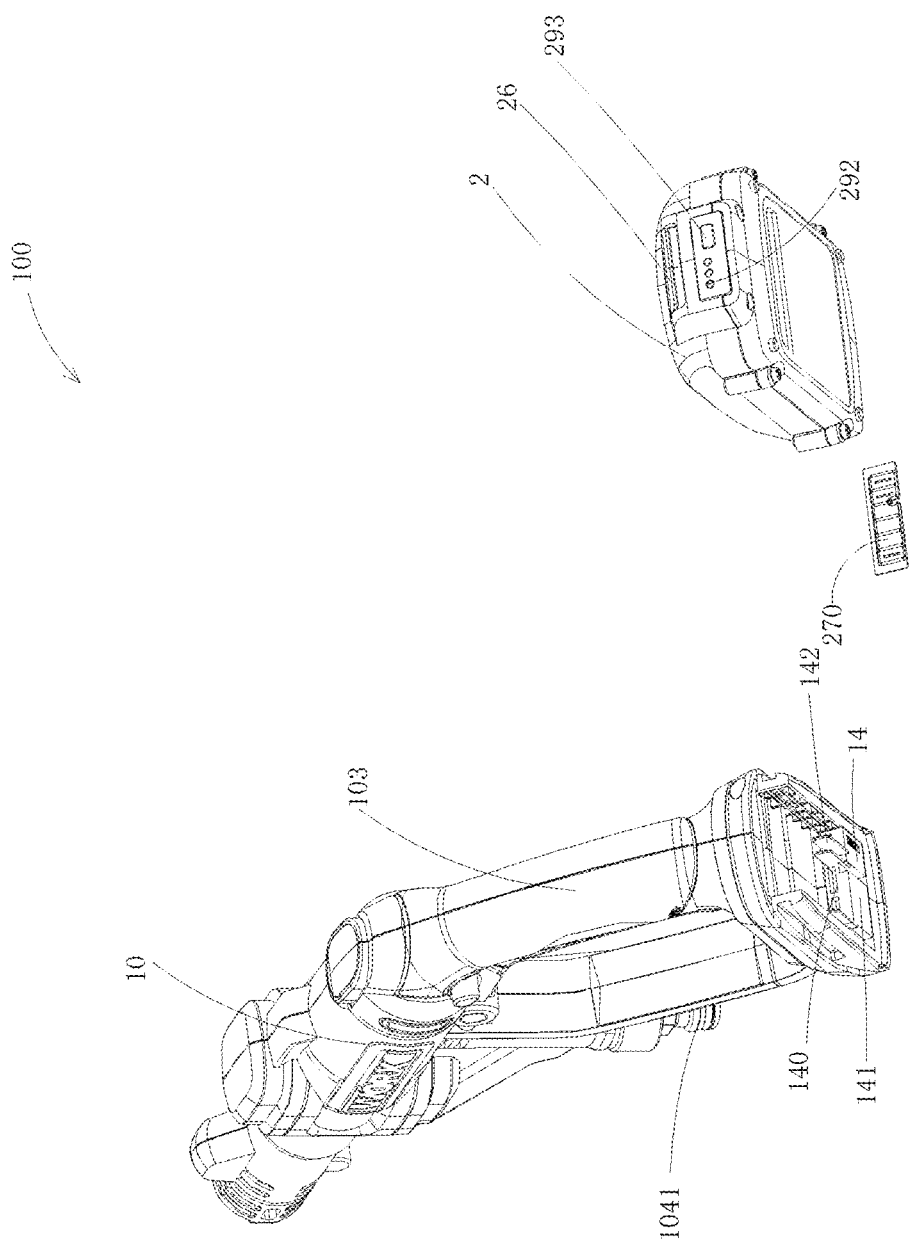
FIG. 10 is an exploded view of a handheld high-pressure cleaner and a battery pack according to the present invention.

As shown in FIG. 9, FIG. 10, and FIG. 11, the housing 10 approximately has a handgun form. The housing 10 uses a structure with a left half and a right half, and includes a first half housing 101 and a second half housing 102 that are connected. The housing 10 includes a handle for holding 103, a body portion 104 disposed at an angle from the handle 103, a water inlet 1041 connected to an external water source, and a water outlet 1042 for discharging water. The motor 111, the transmission mechanism 112, and the pump 113 are located in the body portion 104. For a portability requirement, the high-pressure cleaner 1 provided in the present invention is a handheld high-pressure cleaner. The handheld high-pressure cleaner 1 does not have a water tank for storing a water source, but instead is connected to a water pipe (not shown) through the water inlet 1041. The water pipe (not shown) is then connected to the external water source. The external water source may be a pond, a water tap or the like.

As shown in FIG. 9 and FIG. 10, the handheld high-pressure cleaner 1 further includes a tool terminal connector 14 electrically connected to the battery pack 2. The tool terminal connector 14 includes a base 141 provided with a butting surface 140 and several housing terminals 142 fixed in the base 141. The tool terminal connector 14 is disposed at an end, away from the body portion 104, of the handle 103 and is constructed to be fixedly connected to the bottom of the housing 10. In one of the implementations, the fixed connection may be understood as that the tool terminal connector 14 and the bottom of the housing 10 are joined integrally through a bonding agent. Certainly, in other implementations, alternatively, the tool terminal connector 14 and the bottom of the housing 10 may be detachably connected through a mechanical structure. For example, the tool terminal connector 14 is provided with a locking member (not shown). The bottom of the housing 10 is provided with a locking hole (not shown) for retaining and fitting the locking member. The tool terminal connector 14 is inserted into the locking hole by using the locking member, so that the tool terminal connector 14 is reliably positioned.

The battery pack 2 is disposed at an end, away from the body portion 104, of the handle 103. Referring to FIG. 1 to FIG. 8, FIG. 10, and FIG. 12, the battery pack 2 includes a battery pack cover 21, a battery pack base 22 connected to the battery pack cover 21, a cell group 23 configured to charged and discharged, a battery pack control board 24 electrically connected to the cell group 23, and a battery terminal connector 25 electrically connected to the battery pack control board 24.

Continue to refer to FIG. 1 to FIG. 8. The battery pack cover 21 and the battery pack base 22 respectively have an accommodating cavity. The battery pack cover 21 and the battery pack base 22 are closed opposite each other to form a battery pack housing. The battery pack housing is provided with a fitting surface 211 that can butt and fit the butting surface 140 and define a mounting cavity 20 for accommodating the cell group 23 and the battery terminal connector 25. In this implementation, the fitting surface 211 is formed on the battery pack cover 21. Further specifically, the battery pack cover 21 includes an upper surface 212 and a boss 213 that protrudes upward from the upper surface 212. The boss 213 includes a top surface 2131, a pair of side surfaces 2132 connecting the upper surface 212 and the top surface 2131, and a front end surface 2133. The fitting surface 211 is formed by one or a combination of the surfaces of the battery pack cover 21. In this implementation, the battery terminal connector 25 is accommodated in a chamber defined by the boss 213 and the cell group 23.

Figure 2:
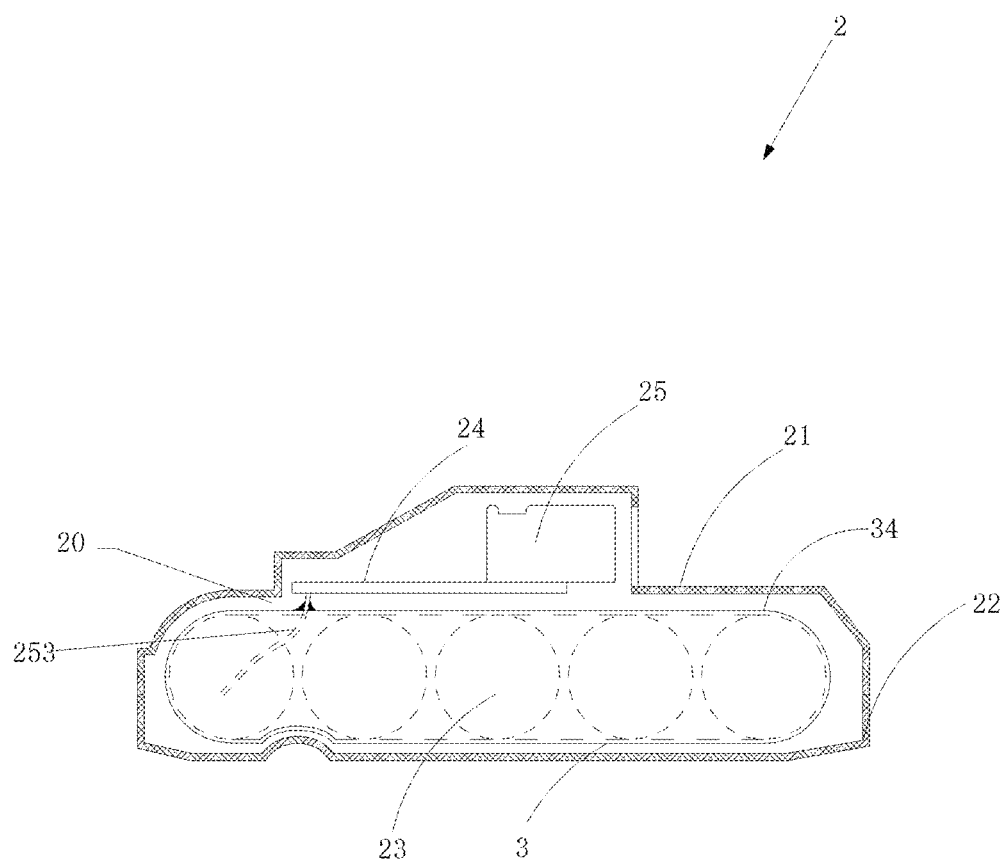
FIG. 2 is a sectional view of a battery pack in a corresponding condition in a second implementation of waterproofing a battery pack according to the present invention.
Figure 4:
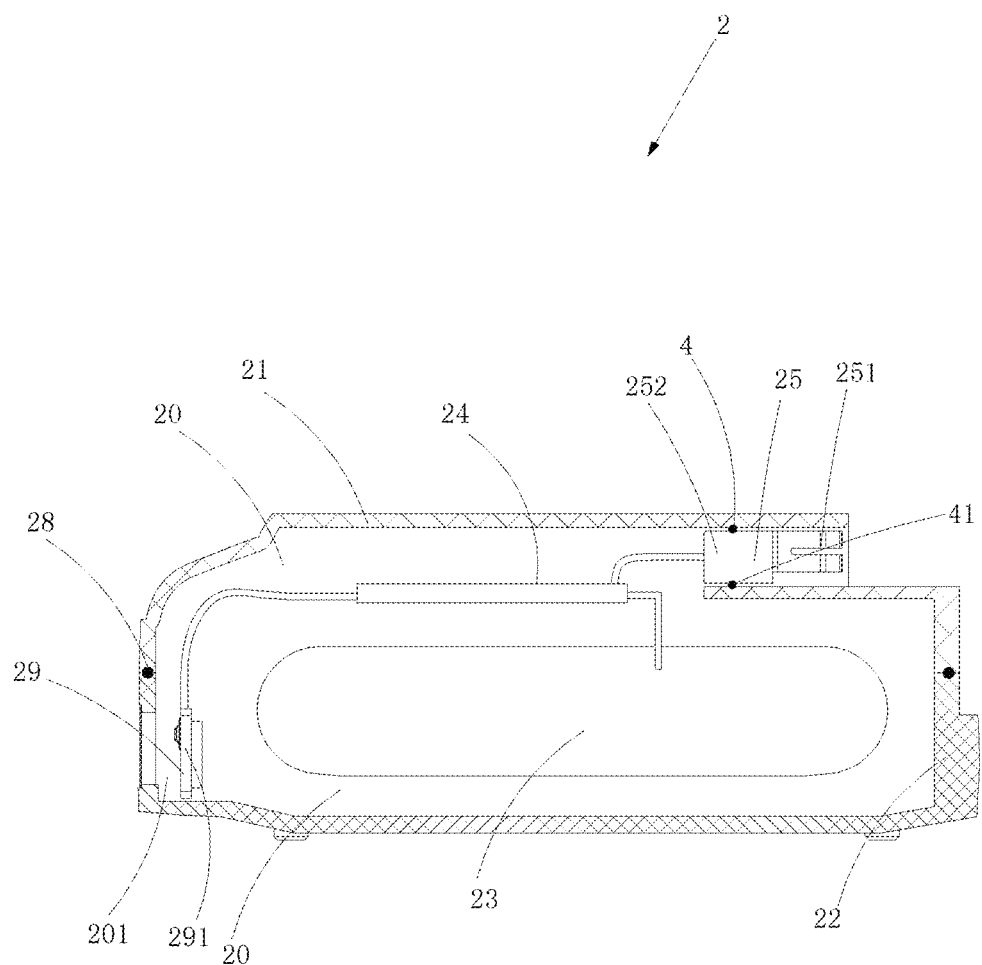
FIG. 4 is a sectional view of a battery pack in a corresponding condition in a feasible manner of a fourth implementation of waterproofing a battery pack according to the present invention.

The cell group 23 includes several cells 231 stacked in rows or rows and columns in the mounting cavity 20. Each cell 231 includes a cell body portion 2311, a first electrode terminal 2312 located on one side of the cell body portion 2311, and a second electrode terminal 2313 located on the other side of the cell body portion 2311. The first electrode terminal 2312 and the second electrode terminal 2313 are disposed opposite each other and have opposite electrode polarity. To ensure that electrical connection can be formed between the cells 231, adjacent first electrode terminals 2312 located on a side of the cell body portion 2311 have opposite polarity. The battery terminal connector 25 includes several battery pack terminals 251 electrically connected to the housing terminals 142. In a feasible implementation, as shown in FIG. 4, the battery terminal connector 25 further includes a terminal base 252 supporting the battery pack terminals 251. The battery terminal connector 25 is electrically connected to the battery pack control board 24 through an electrical conduction member 253. Specifically, the electrical conduction member 253 may be a conductive pole piece or wire. In another feasible manner, as shown in FIG. 2, the battery pack terminals 251 is directly supported on the battery pack control board 24 and is electrically connected to the battery pack control board 24. That is, the battery pack control board 24 may be used as the terminal base.

Figure 12:
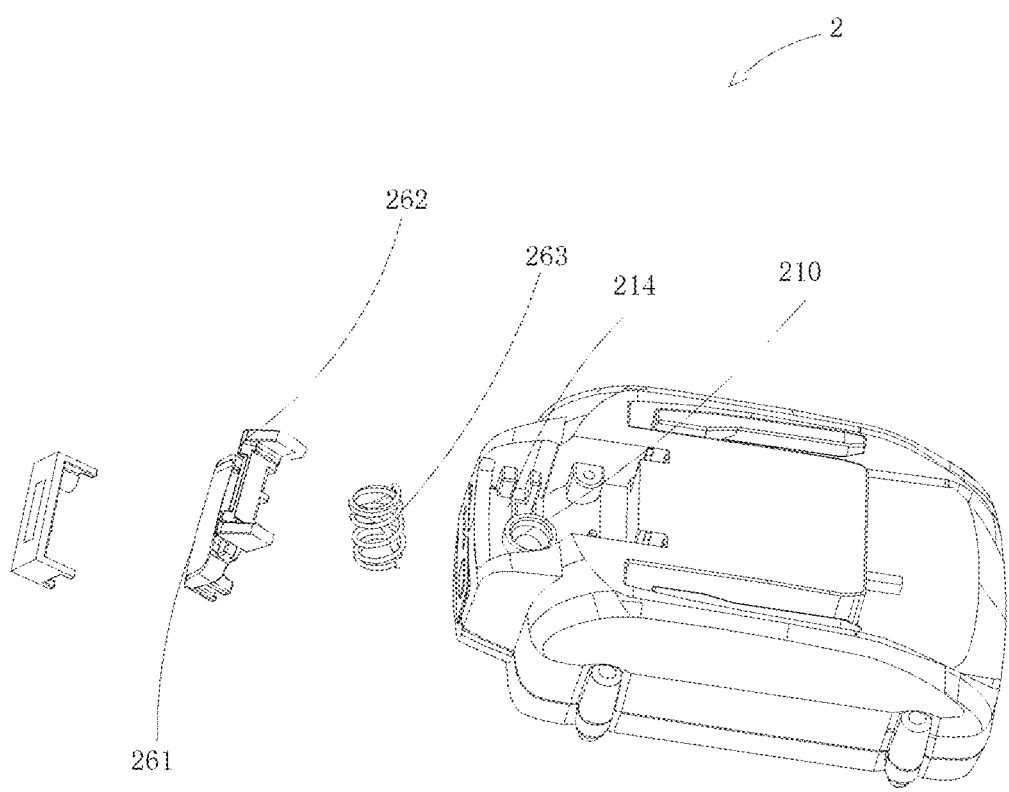
FIG. 12 is partial exploded view of a battery pack according to the present invention.

As shown in FIG. 10 and FIG. 12, the battery pack 2 further includes a locking apparatus 26 mounted on the battery pack housing. The locking apparatus 26 is movable relative to the battery pack housing to enable the battery pack 2 and the handheld high-pressure cleaner 1 to be connected or detached. Specifically, the locking apparatus 26 includes an operation portion 261 and a clamp portion 262. The operation portion 261 is specifically a button. The button is capable of driving the clamp portion 262 to move vertically relative to the battery pack housing, so that the battery pack 2 can operably exit the housing 10. Further, an elastic apparatus 263 is provided between a bottom surface of the locking apparatus 26 and an outer surface of the battery pack cover 21. Preferably, the elastic apparatus 263 is a spring. An outer surface of the battery pack cover 21 is provided with a mounting groove 210. The spring is at least partially limited in the mounting groove 210. When the battery pack 2 needs to be detached from the handheld high-pressure cleaner 1, a button is pressed, and the button drives the clamp portion 262 to move downward to be detached from the handheld high-pressure cleaner 1. In this case, the spring is subject to a pressure from the button and exerts an upward restoring force to the button. The restoring force is used to enable the locking apparatus 26 to restore the original height after being pressed.

Further, in this implementation, the handheld high-pressure cleaner 1 and the battery pack 2 are inserted to fit to form a socket 27 for electrically connecting the housing terminals 142 and the battery pack terminals 251. The socket 27 may be optionally configured on the handheld high-pressure cleaner 1 or the battery pack 2. According to different positions at which the socket 27 is provided, the present invention provides the battery pack 2 in two forms of structure.

Specifically, as shown in FIG. 1 to FIG. 8, when the socket 27 is configured on the battery pack 2, the battery pack 2 has the first form of structure. That is, the housing terminals 142 is configured to be a sheet-shaped terminal protruding outside. The fitting surface 211 of the battery pack 2 is formed with the socket 27 for inserting the housing terminals 142 to be electrically connected to the battery pack terminals 251.

When the socket 27 is configured on the handheld high-pressure cleaner 1, the battery pack has a second form of structure (not shown). In this case, the battery pack terminals is configured to be a sheet-shaped terminal protruding outside (not shown). The battery pack terminals is inserted in the housing 10 through the socket to be electrically connected to the housing terminals 142.

Because in this embodiment of the present disclosure, the battery pack 2 is shown with the first structure. Therefore, only the first structure is described below in detail.

The handheld high-pressure cleaner 1 may have different ranges of working water pressures and working water flowrates according to different cleaning scenarios and cleaning objects. Specifically, in this embodiment of the present disclosure, a working water pressure at which the handheld high-pressure cleaner 1 discharges water may be specifically a value or range of values chosen within a range of 0.2 Mpa to 10 Mpa. A working water flowrate at which the handheld high-pressure cleaner 1 discharges water may be specifically a value or range of values chosen from a range of 1.5 L/Min to 8 L/Min. For example, the working water pressure of the handheld high-pressure cleaner 1 may be set to 0.3 Mpa to 2.49 Mpa, and the working water flowrate may be set to 1.5 L/Min to 3.4 L/Min. Alternatively, the working water pressure of the handheld high-pressure cleaner 1 may be set to 0.3 Mpa to 5 Mpa, and the working water flowrate may be set to 1.5 L/Min to 6 L/Min.

In addition, in this implementation, one or more battery packs 2 are provided. In one of the implementations, there is one battery pack 2. A voltage of the battery pack 2 is 18 V to 60 V. To be specific, the voltage of the battery pack 2 may be 18 V, 20 V, 28 V, 36 V, 38 V, 40 V, 42 V, 56 V or 60 V. The capacity of battery pack 2 may be 1.5 Ah, 2 Ah, 2.5 Ah, 3 Ah or 4 Ah. Certainly, in another possible implementation, there may be alternatively two battery packs 2.

It should be noted that the handheld high-pressure cleaner 1 powered by the battery pack 2 is bound to satisfy users' portability requirements. However, in related test standards, there are corresponding waterproofing requirements for direct-current handheld high-pressure cleaners 1. The safety of using the machine by a user can be ensured only when the direct-current handheld high-pressure cleaner 1 satisfies corresponding waterproofing requirements. The waterproofing requirements herein should be understood as follows: When the handheld high-pressure cleaner 1 has the corresponding working water pressure and the battery pack 2 has the corresponding voltage, the handheld high-pressure cleaner 1 coupled with the battery pack 2 is placed in a corresponding extreme environment, and it can be ensured that the machine can satisfy waterproofing standards. It should further be noted that compared with other electric tools, the direct-current handheld high-pressure cleaner 1 is restricted by different manners in which a user holds the machine (according to different use scenarios or cleaning working conditions, the user may rotate the body in a longitudinal direction to choose an appropriate angle to hold the machine) and therefore has more strict waterproofing requirements. Therefore, the extreme environment herein should be understood as that the handheld high-pressure cleaner 1 coupled with the battery pack 2 needs to be tested in various directions. That is, when the machine is held vertically, horizontally, upside down or in others manners, corresponding waterproofing requirements can be satisfied at a corresponding working water pressure and a corresponding voltage of the battery pack 2.

Currently, there are many individual battery pack waterproofing solutions on the market. However, by means of these solutions, only a partial area of a battery pack can prevent water from entering a mounting cavity of the battery pack, or only a partial area can prevent water from entering the mounting cavity of the battery pack in a single test direction (the machine is vertically placed). Such solutions are inadequate for these handheld high-pressure cleaner assemblies (a handheld high-pressure cleaner and a battery pack are coupled to form a handheld high-pressure cleaner assembly) with relatively high waterproofing requirements, and the waterproofing problem cannot be completely resolved.

In this embodiment of the present disclosure, first, the handheld high-pressure cleaner 1 and the battery pack 2 are inserted to fit. Generally, there is a fit clearance at the fit. That is, a surface where the battery pack 2 and the handheld high-pressure cleaner 1 contact each other cannot be a completely tight fit, and an assembly gap exists between the battery terminal connector 25 and an inner wall of the mounting cavity 20 of the battery pack. External water can flow into the socket 27 of the battery pack along the fit clearance between the handheld high-pressure cleaner 1 and the battery pack 2 and flow into the cell group 23 through the gap between the battery terminal connector 25 and the inner wall of the mounting cavity 20 of the battery pack. Further, there may be contact with water between both electrode terminals (the first electrode terminal 2312 and the second electrode terminal 2313) of the cell group 23 and the cell body portion 2311. In this case, the circuits in the battery pack 2 are prone to short circuits, leading to safety hazards such as electrical leakage, electric shocks or even cell explosions. For this, the embodiments of the present disclosure provide several battery pack waterproofing implementations in the following, which are described below in detail:

Specifically, the battery pack 2 includes a waterproof structure 3 wrapping at least a partial structure of each cell 231.

In the first implementation of waterproofing the battery pack 2 in this embodiment of the present disclosure, as shown in FIG. 1, the waterproof structure 3 includes a first waterproof body 31 wrapping the first electrode terminal 2312 of each cell 231 and a second waterproof body 32 wrapping the second electrode terminal 2313 of each cell 231. In other words, each cell 231 is not completely wrapped by the waterproof structure 3, and only two electrode terminals of each cell 231 are wrapped with the waterproof structure 3. In this case, when the handheld high-pressure cleaner 1 coupled with the battery pack 2 is placed in a corresponding test environment, it can be ensured that there is no water at two electrode terminals of each cell 231. Further, the battery pack control board 24 and/or the battery terminal connector 25 may be disposed between the first waterproof body 31 and the second waterproof body 32. In one aspect, the cost of waterproof materials and the weight of the battery pack 2 are reduced. In another aspect, a mounting area may be reserved for mounting the battery pack control board 24 and/or the battery terminal connector 25. In a possible implementation, the first waterproof body 31 and the second waterproof body 32 may be an encapsulated adhesive formed through encapsulation. Certainly, the first waterproof body 31 and the second waterproof body 32 may be alternatively designed as a waterproof tape. In another possible implementation, the first waterproof body 31 and the second waterproof body 32 are both sealed cases (not shown) made of a waterproof material. A joint between the sealed cases and the cell group 23 may be sealed by using a bonding adhesive (which may be specifically a waterproof bonding agent).

Furthermore, in this implementation, the battery pack base 22 is further provided with a drainage hole 220. Water can reach the drainage hole 220 along a space between the cell group 23 and the battery pack base 22, and water that enters the mounting cavity 20 of the battery pack is discharged through the drainage hole. There may be one or more drainage holes 220. For example, six drainage holes or eight drainage holes may be configured. If there are several drainage holes, adjacent drainage holes are offset from each other. Preferably, the battery pack 2 further includes a drainage path disposed between the cell group 23 and the drainage hole 220. The drainage path is used to guide water to be discharged rapidly along a particular path. Preferably, the drainage hole 220 is disposed at the lowest point of the battery pack base 22. In such a design, it can be ensured that there is no residual water between adjacent cells 231.

In this implementation, only the structural design of the cell group 23 of the battery pack 2 is changed and the drainage hole 220 provided in the battery pack base 22 is used in combination, so that the overall machine formed by coupling the battery pack 2 to the handheld high-pressure cleaner 1 can satisfy test standards in particular conditions. An existing platform for the battery pack 2 requires only small changes, the costs are low, and the volume of the battery pack 2 is not increased much.

A difference between the second implementation of waterproofing the battery pack 2 in this embodiment of the present disclosure and the first implementation is mainly that the cell group 23 is partially wrapped in the first implementation, whereas the cell group 23 is completely sealed and wrapped in this implementation. Specifically, the waterproof structure 3 further includes a third waterproof body (not shown) wrapped around each cell body portion 2311. As shown in FIG. 2, the first waterproof body 31, the second waterproof body 32, and the third waterproof body are integrally formed into an independent overall structure. The independent overall structure is completely wrapped around the cell group 23 to prevent external water from flowing between two electrode terminals of a cell and/or between the cells 231.

The waterproof structure 3 is an encapsulated adhesive 34 formed through encapsulation. The encapsulated adhesive 34 completely wraps the cell group 23. For example, as discussed above, the battery pack 2 further includes the electrical conduction member 253 electrically connected between the cell group 23 and the battery pack control board 24. To avoid gaps between the electrical conduction member 253 and the encapsulated adhesive 34, a waterproof bonding agent is applied at a connection between the electrical conduction member 253 and the encapsulated adhesive 34 to prevent water from flowing onto the cell group 23 the gaps. Certainly, the waterproof structure 3 may be alternatively designed as a waterproof tape. The waterproof tape can be directly wound around the entire cell group.

Figure 3:
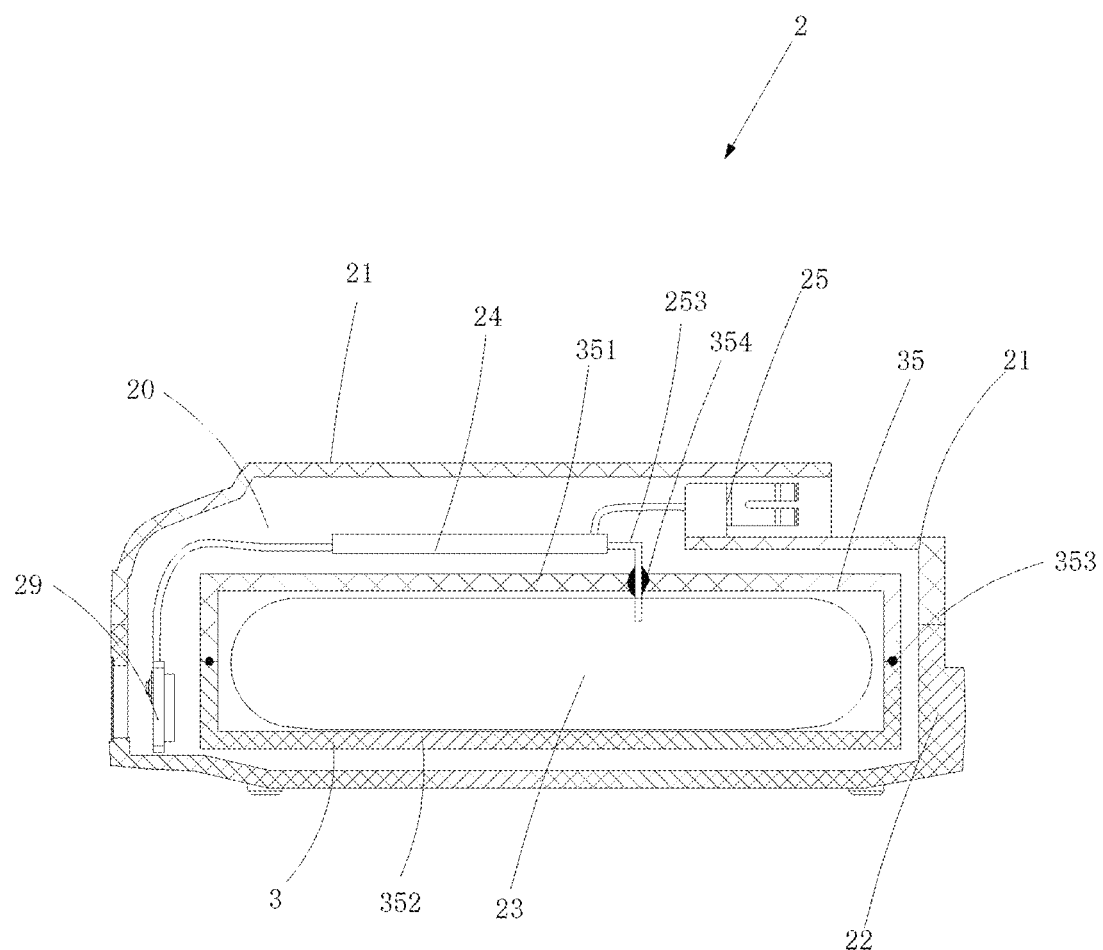
FIG. 3 is a sectional view of a battery pack in a corresponding condition in a third implementation of waterproofing a battery pack according to the present invention.

A difference between the third implementation of waterproofing the battery pack 2 in this embodiment of the present disclosure and the first implementation is mainly that in the first implementation, the cell group 23 is partially wrapped, and in this implementation, the cell group 23 is completely sealed and wrapped. Specifically, as shown in FIG. 3, the waterproof structure 3 is a sealed case 35 accommodated in the mounting cavity 20. The sealed case 35 is made of a waterproof material. The sealed case 35 includes a first sealed case 351 and a second sealed case 352 that are joined to each other. The first sealed case 351 and the second sealed case 352 are joined to form an accommodating space. The cell group 23 is entirely accommodated in the accommodating space. The first sealed case 351 and the second sealed case 352 may be tightened through a screw or tightly joined through a fastener. After the first sealed case 351 and the second sealed case 352 are mechanically joined, to avoid a joining gap between the two sealed cases, in this implementation, the battery pack 2 further includes a joint seal member 353 disposed between the first sealed case 351 and the second sealed case 352. When the first sealed case is assembled to the second sealed case, the joint seal member 353 prevents external water from flowing into accommodating space through the joining gap. Specifically, the joint seal member 353 may be a seal ring. The first sealed case 351 is in contact with the second sealed case 352 and presses the seal ring to seal an assembly gap. Certainly, the joint seal member 353 may be alternatively a waterproof bonding agent.

Similarly, the battery pack 2 further includes the electrical conduction member 253 electrically connected between the cell group 23 and the battery pack control board 24. To prevent a gap that affects sealing performance from forming between the electrical conduction member 253 and the sealed cases, a waterproof bonding agent 354 is further applied at the connection between the electrical conduction member 253 and the sealed cases to prevent water from flowing onto the cell group 23 through the gaps.

In the fourth implementation of waterproofing a battery pack in this embodiment of the present disclosure, first, an assembly gap exists between the battery terminal connector 25 and the mounting cavity 20 of the battery pack 2. Therefore, the socket 27 is in communication with the mounting cavity 20. The water that enters through the socket 27 may flow into the mounting cavity 20 through the assembly gap. As shown in FIG. 4, in this implementation, the battery pack 2 is configured with a seal member 4 blocking a passage from the assembly gap to the cell group 23. In addition, the seal member 4 is disposed in the mounting cavity 20 of the battery pack 2.

In a feasible manner, the seal member (not shown) is tightly pressed between the socket 270 and the terminal base 252. Specifically, a thickness of the seal member 4 in a free state is greater than a gap between the terminal base 252 and the socket 27, so as to fill the gap between the terminal base 252 and an inner wall of a battery pack to prevent water that enters through the socket 27 from further flowing into the mounting cavity 20.

In another feasible manner, when the battery terminal connector 25 is configured to be supported by the battery pack housing, as shown in FIG. 4, the seal member 4 is an annular waterproof structure 41 tightly pressed between the battery terminal connector 25 and the battery pack housing, so that a gap between the battery terminal connector 25 and an inner wall of the battery pack is filled and sealed. When the battery terminal connector 25 is configured to be supported on the cell group 23 (the position of the battery terminal connector 25 shown in FIG. 2), in a joint direction of the battery pack cover 21 and the battery pack base 22, the seal member 4 is pressed between the battery terminal connector 25 and the cell group 23. In a direction from the first electrode terminal 2312 to the second electrode terminal 2313, the seal member 4 is pressed between the battery pack housing and the battery terminal connector 25. Specifically, the seal member 4 is connected to a terminal base 252 of the battery pack 2. An annular concave groove (not shown) is formed at a circumferential side of the terminal base 252. The seal member 4 is assembled in the concave groove. Further, the battery pack 2 further includes a bonding agent that bonds the seal member 4 and the concave groove together. It should be noted that the seal member 4 may be understood as a separating wall disposed between the battery terminal connector 25 and the mounting cavity 20. Therefore, even if water can enter through the socket 27 in the battery pack 2, the water cannot enter the mounting cavity 20.

Figure 5:
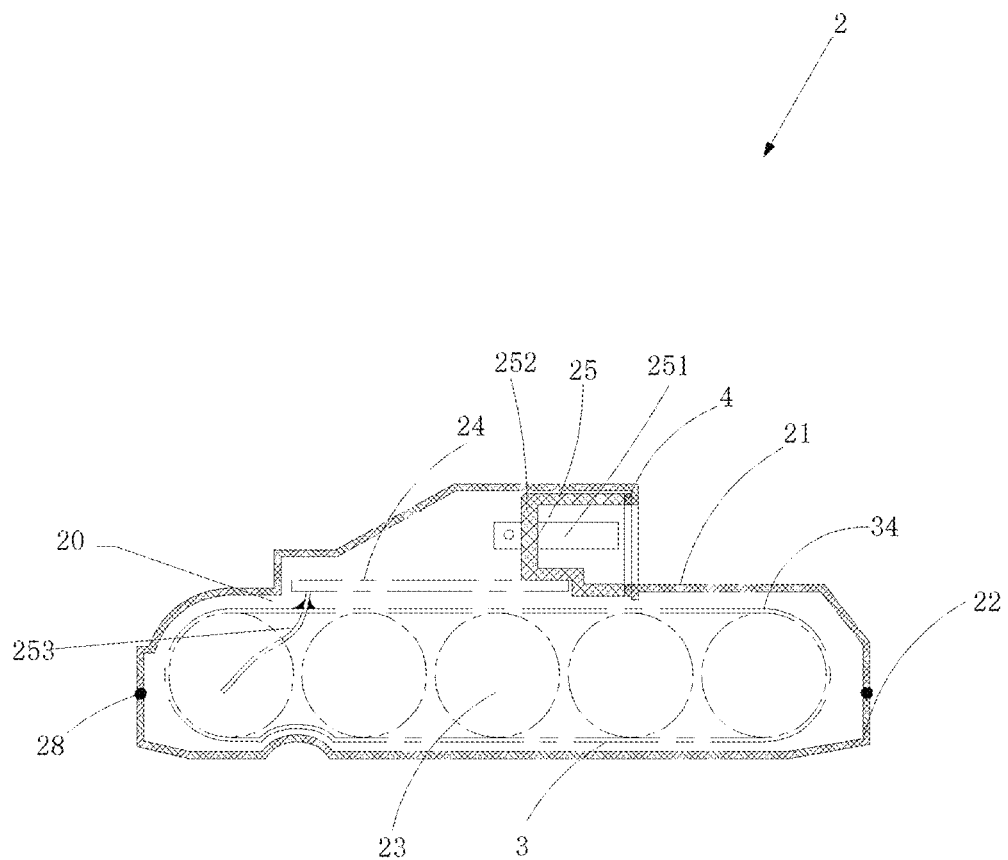
FIG. 5 is a sectional view of a battery pack in a corresponding condition in another feasible manner of the fourth implementation of waterproofing a battery pack according to the present invention.

In still another feasible manner, as shown in FIG. 5, the terminal base 252 is constructed to be a waterproof box body, and the battery pack terminals 251 and the waterproof box body 252 are integrally formed. The waterproof box body 252 is provided, in a direction facing the socket 27, with an opening for the housing terminals 142 to pass through. One whole independent opening may be designed. Alternatively, a plurality of holes that are offset relative to each other may be designed, and the plurality of openings have a one-to-one correspondence with the battery pack terminals 251. The seal member 4 is sealed between an inner wall of the battery pack 2 and the waterproof box body 252 to close an assembly gap between the waterproof box body 252 and the inner wall of the battery pack. Further, a maximum sectional area of the waterproof box body 252 in a joint direction of the battery pack cover 21 and the battery pack base 22 is not less than a sectional area of the socket 27 in the joint direction. The structure of a conventional battery terminal connector 25 is changed, and the structure of the terminal base 252 is changed. Therefore, in one aspect, it is ensured that the battery pack terminals 251 is electrically joined to the housing terminals 142. In another aspect, water can only flow into the waterproof box body but cannot contact the cell group 23.

Further, a feasible manner is further provided. The seal member (not shown) is attached on the socket 27, and is the seal member attached on the socket is disposed on an inner wall of the battery pack 2. The seal member and the fitting surface 211 of the battery pack 2 are disposed back to back. The seal member is provided with a through hole for the housing terminals 142 to pass through. To ensure the sealing performance, the through hole and the housing terminals are in interference fit, and the through hole is configured to have a structure that does not prevent the seal member from isolating the socket 27 from the cell group 23 and is used for the housing terminals 142 to pass through.

In the various feasible manners listed in the fourth implementation, the seal member 4 is one or a combination of a block-shaped flexible seal washer, an encapsulated adhesive formed through encapsulation, a waterproof bonding agent, and a melt formed through welding.

Figure 6:
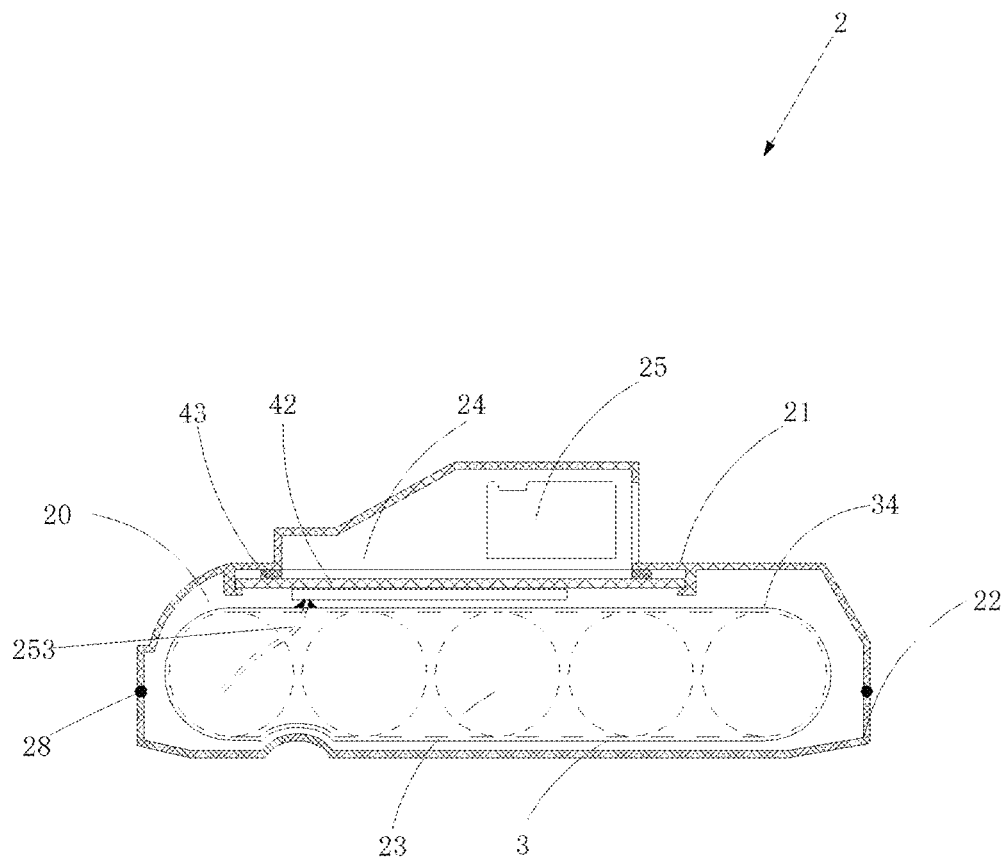
FIG. 6 is a sectional view of a battery pack in a corresponding condition in another feasible manner of the fourth implementation of waterproofing a battery pack according to the present invention.

In addition, as shown in FIG. 6, in the feasible manner, the seal member 4 is a partitioning plate 42 disposed between the battery terminal connector 25 and the cell group 23. The cell group 23 is located in a sealed space defined by the partitioning plate 42 and the inner wall of the battery. Circumferential edges of the partitioning plate 42 abut the inner wall of the battery pack. The seal member 4 further includes a waterproof bonding agent or waterproof gasket 43 bonded between the circumferential edge of the partitioning plate 42 and the inner wall of the battery pack. Specifically, two brackets that are parallel in a longitudinal direction (that is, an insertion direction of the battery pack) are provided in the mounting cavity 20, and the partitioning plate 42 is located between the two parallel brackets 202. In the longitudinal direction, the waterproof bonding agent is bonded between the partitioning plate 42 and the two parallel brackets. Certainly, two parallel brackets may also be provided in a transverse direction (that is, a direction from the first electrode terminal 2312 to the second electrode terminal 2313) in the mounting cavity 20. That is, the partitioning plate is supported on the four brackets, and the assembly is more stable.

Next, the battery pack cover 21 and the battery pack base 22 of the battery pack 2 provided in this embodiment of the present disclosure are separate structures. The battery pack cover 21 and the battery pack base 22 are tightly connected through a screw (not shown). With the tight connection through a screw, an assembly gap inevitably exists at the connection between the battery pack cover 21 and the battery pack base 22. External water can flow into the mounting cavity 20 of the battery pack 2 through the assembly gap. As a result, there is water on two electrode terminals of each cell 231 and/or there is residual water between cell groups 23 to cause short circuits in the circuits in the battery pack 2, leading to safety hazards such as electrical leakage, electric shocks or even cell explosions. Therefore, in this implementation, as shown in FIG. 4, the battery pack 2 is further configured with a battery pack housing seal member 28 blocking a passage from the assembly gap between the battery pack cover 21 and the battery pack base 22 to the cell group 23. The battery pack housing seal member 28 is disposed at a connection between the battery pack cover 21 and the battery pack base 22. When the battery pack cover 21 and the battery pack base 22 are closed, the battery pack housing seal member 28 prevents external water from flowing into the mounting cavity 20. It should be noted that the connection herein is not merely an area tightened with a screw or an area buckled with a fastener structure, but instead, is an area where the entire circumferential edge of the battery pack cover 21 and the entire circumferential edge of the battery pack base 22 are in contact. In a feasible implementation, the battery pack housing seal member 28 is a flexible seal washer. When the battery pack base 22 and the battery pack cover 21 contact, the flexible seal washer is pressed to seal the assembly gap between the battery pack cover 21 and the battery pack base 22. Certainly, in other implementations, the battery pack cover 21 and the battery pack base 22 may be sealed through welding such as ultrasonic welding or laser welding.

Figure 8:
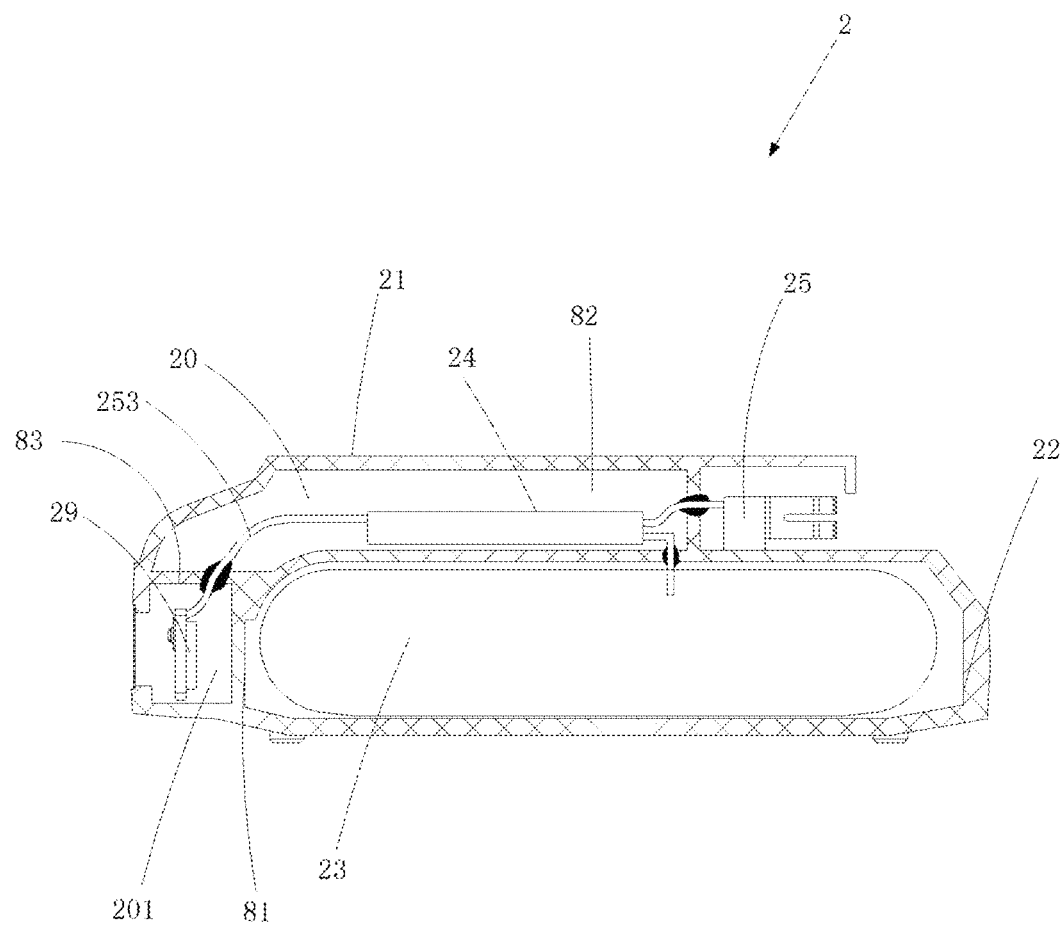
FIG. 8 is a sectional view of another solution of a battery pack in the second implementation of waterproofing a battery pack in a condition in which all electrical devices in a handheld high-pressure cleaner assembly need to be waterproofed according to the present invention.

Preferably, as shown in FIG. 4, FIG. 8, and FIG. 10, the battery pack 2 further includes a display apparatus 29 that indicates working characteristics of the battery pack and a display apparatus accommodating cavity 201 accommodating the display apparatus. The display apparatus accommodating cavity 201 is located in the mounting cavity 20. The display apparatus 29 includes a display apparatus control board 291 and a power display lamp 292 and a power display button 293 that are electrically connected to the display apparatus control board 291. The power display button 293 is operably triggered to turn on the power display lamp 292. In this implementation, the display apparatus accommodating cavity 201 is defined by the battery pack housing seal member 28 as a closed space, to prevent external water from flowing into the battery pack 2 through the display apparatus accommodating cavity 201.

In addition, the inventor finds that an existing locking apparatus is assembled on the battery pack housing, and the locking apparatus is at least partially located in the mounting cavity 20. The locking apparatus is movable relative to the battery pack housing to be connected to or detached from the housing 10. In other words, a movement gap for the locking apparatus to move is provided between the locking apparatus and the mounting cavity 20, and external water easily enters the mounting cavity of the battery pack through the movement gap. As a result, there is water on two electrode terminals of each cell 231 and/or between the cells 231.

Therefore, in this implementation, it is configured that the locking apparatus 26 and the mounting cavity 20 are independent of each other and are not in communication. Specifically, the locking apparatus 26 is mounted on the battery pack housing, and the locking apparatus 26 is isolated from the mounting cavity 20 of the battery pack 2. The battery pack housing is formed with a movement space for the locking apparatus 26 to move. The movement space is independently isolated from the mounting cavity 20, to prevent external water that enters the movement space from further flowing into the mounting cavity 20.

In a feasible implementation, the locking apparatus 26 is detachably mounted on an outer surface of the battery pack cover 21. Specifically, as shown in FIG. 12, the battery pack cover 21 is integrally formed, and the battery pack cover 21 is provided with a retaining cavity 214 that is concave in an outer surface of the battery pack cover 21 and at least partially surrounds the locking apparatus 26. The retaining cavity 214 forms a movement space for the locking apparatus 26 to vertically move. The retaining cavity 214 and the mounting cavity 20 are not in communication with each other, to prevent external water that enters the retaining cavity 214 from further entering the mounting cavity 20.

In another feasible implementation, the battery pack 2 further includes an isolation member (not shown). The isolation member is detachably mounted on the battery pack housing and the isolation member is concavely provided with a retaining cavity accommodating the locking apparatus 26. The isolation member isolates the retaining cavity from the mounting cavity. In this implementation, the battery pack 2 further includes an isolation seal structure (not shown) disposed between the isolation member and the battery pack housing, to block a passage from an assembly gap between the isolation member and the battery pack housing to the mounting cavity. Specifically, the isolation seal structure is a flexible seal washer pressed between the isolation member and the battery pack housing. Certainly, in other implementations, the isolation member and the battery pack housing may be alternatively sealed in a welding manner.

In the fourth implementation of waterproofing a battery pack, the overall machine formed by coupling the battery pack 2 to the handheld high-pressure cleaner 1 can satisfy test standards in a particular condition by only closing all water inlet paths in the battery pack 2 without making any change to the structure of the cell group 23. In such a design, while the waterproofing reliability of the battery pack 2 is comprehensively ensured, the structure is simple, the costs are low, and no major change needs to be made to a battery pack platform, so that the battery pack 2 powering the handheld high-pressure cleaner 1 may also power other tools.

There is a different waterproofing requirement for a direct-current high-pressure cleaner 1 in the industry. The different waterproofing requirement is determined by a working water pressure at which the handheld high-pressure cleaner 1 sprays water and a voltage of a battery pack. In the three implementations, it can be ensured that when the working water pressure of spraying water is less than 2.5 Mpa and the voltage of the battery pack is less than 42.4 V, the direct-current handheld high-pressure cleaner assembly satisfies waterproofing requirements in safety standards.

Moreover, it can be further ensured that when the working water pressure of spraying water is greater than 2.5 Mpa and the voltage of the battery pack 2 coupled to the handheld high-pressure cleaner 1 is greater than 42.4 V, the waterproofing of the handheld high-pressure cleaner 1 the battery pack 2 can satisfy the requirements in the safety standards.

It should further be noted that, when the handheld high-pressure cleaner 1 sprays water at a working water pressure greater than 2.5 Mpa and the voltage of the battery pack 2 coupled to the handheld high-pressure cleaner 1 is greater than 42.4 V, the industry has more strict waterproofing requirements for the direct-current handheld high-pressure cleaner 1. In the waterproofing requirements, it needs to be ensured that no water exists on the surface of a charged body in the entire machine (the handheld high-pressure cleaner 1 and the battery pack 2), and a particular creepage distance needs to be satisfied. In other words, it means that the charged body on the battery pack 2 needs to be waterproofed and the tool electrical device accommodated in the housing 10 of the handheld high-pressure cleaner 1 further needs to be waterproofed, thereby ensuring that the handheld high-pressure cleaner 1 satisfies the requirements of waterproofing standards. For this, the embodiments of the present disclosure provide several waterproofing implementations in the following. The waterproofing implementations are described below in detail:

First, the waterproofing of the tool electrical device accommodated in the housing 10 in this embodiment of the present disclosure is first introduced.

Figure 13:
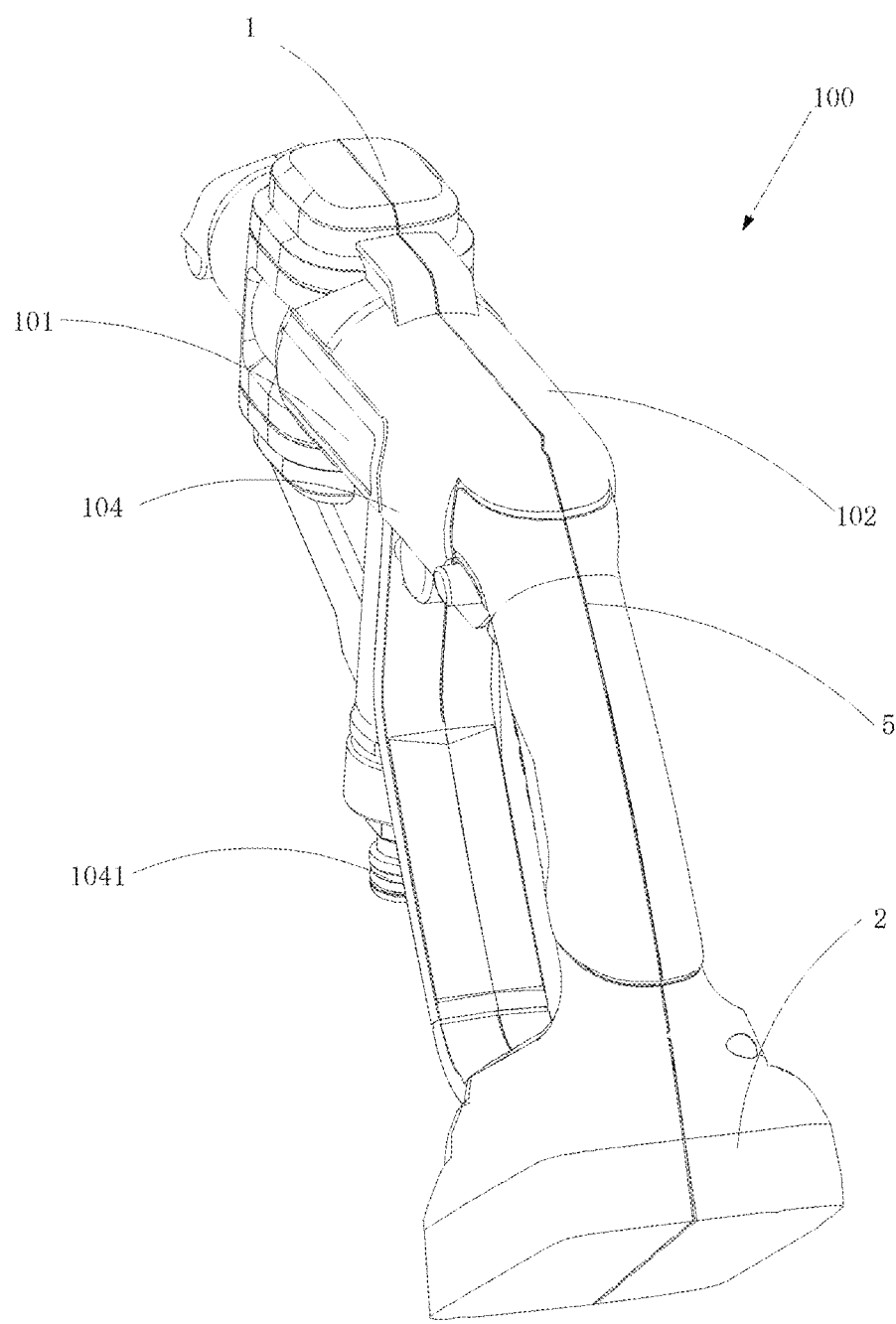
FIG. 13 is a schematic view of a first implementation of waterproofing a tool electrical device in a housing of a handheld high-pressure cleaner according to the present invention.

In the first implementation of waterproofing the tool electrical device in the housing 10 in this embodiment of the present disclosure, as shown in FIG. 9 to FIG. 11, both the first half housing 101 and the second half housing 102 of the housing 10 are physical structures. The first half housing 101 and the second half housing 102 may be connected in a conventional mechanical fastening manner such as a screw or a fastener and form the accommodating cavity 106. When a screw or fastener is used for connection, a joint gap inevitably exists at the connection between the first half housing 101 and the second half housing 102. External water can flow into the accommodating cavity 106 of the housing 10 through the joint gap. As a result, there is water on the surface in the tool electrical device accommodated in the housing 10. Therefore, in this implementation, as shown in FIG. 13, the housing 10 is further configured with a main housing seal member 5 that blocking a passage from the joint gap between the first half housing 101 and the second half housing 102 to the accommodating cavity 106. The main housing seal member 5 is disposed at a connection between the first half housing 101 and the second half housing 102. After the first half housing 101 and the second half housing 102 are assembled, the main housing seal member 5 prevents water from flowing into the accommodating cavity 106 of the housing 10.

In a feasible implementation, the main housing seal member 5 is a flexible seal strip. Certainly, in other implementations, the first half housing 101 and the second half housing 102 may be alternatively sealed in a welding manner. That is, the main housing seal member 5 may also be understood as a waterproof bonding agent or a welding sealing manner such as ultrasonic welding.

Further, the pump 113 includes a pump body 1131, a plunger (not shown) accommodated in the pump body 1131, a water inlet (not shown) and a water outlet (not shown) that are disposed in the pump body 1131, and a central chamber (not shown). The water inlet in the pump body 1131 and a water inlet 1041 are disposed to be in communication. The plunger moves to drive a cleaning liquid to flow into the central chamber through the water inlet 1041 and flow in a direction from the water outlet of the pump body 1131 to a water outlet pipe 110. The handheld high-pressure cleaner 1 further includes the water outlet pipe 110 that is in communication and connected to the water outlet of the pump body 1131. The water outlet pipe 110 is accommodated in the housing 10. In this implementation, when the water outlet pipe 110 is accommodated in the housing 10, an assembly gap is provided between the water outlet pipe 110 and the housing 10. The handheld high-pressure cleaner 1 is configured with a water outlet pipe seal member 6 blocking a passage from the assembly gap to the accommodating cavity 106 of the housing 10 to isolate the water outlet 1042 from the tool electrical device accommodated in the housing 10. In a feasible implementation, a water outlet pipe seal member 6 is a seal ring pressed between the water outlet pipe 110 and the housing 10. In another feasible implementation, the water outlet pipe seal member 6 may be alternatively an encapsulated adhesive formed through encapsulation. Certainly, in other implementations, the assembly gap between the housing 10 and the water outlet pipe 110 may further be filled in a welding manner.

In addition, in this implementation, the tool terminal connector 14 is fixedly connected to the bottom of the housing 10. An assembly gap is provided between the tool terminal connector 14 and the housing 10. A tool terminal connector seal member (not shown) is provided between the tool terminal connector 14 and the housing 10 to prevent external water from flowing into the accommodating cavity 106 of the housing 10 through the assembly gap. In a feasible implementation, the tool terminal connector seal member (not shown) is a seal ring pressed between the tool terminal connector 14 and the housing 10. In another feasible implementation, the tool terminal connector seal member may be alternatively an encapsulated adhesive formed in an encapsulated. Certainly, in other implementations, the gap between the housing 10 and the tool terminal connector 14 may be further filled through welding.

In this implementation, the joint gap between the half housings is sealed, a fitting gap between the water outlet pipe 110 and the housing 10 is sealed, and an assembly gap between the housing 10 and the tool terminal connector 14 is sealed, so as to comprehensively close all water openings in the housing 10, thereby preventing water from entering the accommodating cavity 106 of the housing to reach the surface of the tool electrical device accommodated in the housing 10.

Figure 14:
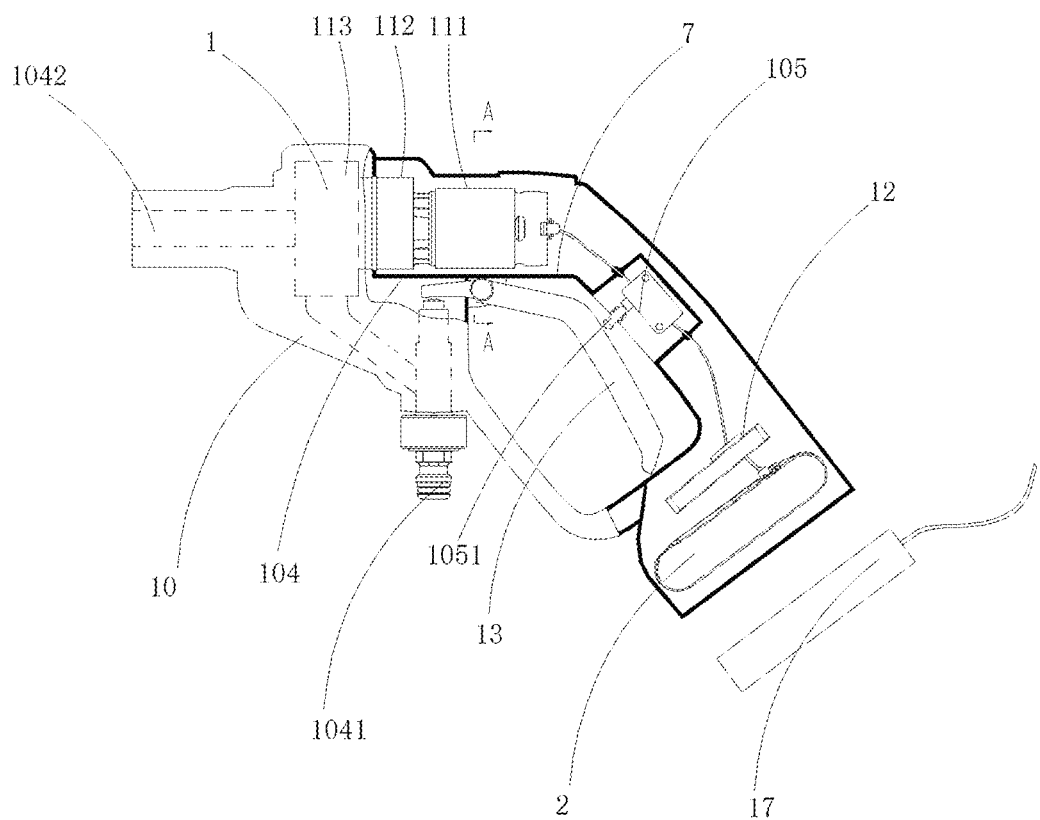
FIG. 14 is a schematic view of a second implementation of waterproofing a tool electrical device in a housing of a handheld high-pressure cleaner according to the present invention.

In the second implementation of waterproofing the tool electrical device in the handheld high-pressure cleaner 1 in this embodiment of the present disclosure, as shown in FIG. 14, a difference between this implementation and the foregoing embodiments is as follows: The first half housing 101 and the second half housing 102 in this embodiment are tightly connected only in a simple mechanical connection manner, for example, through a fastener, a screw or the like. Moreover, a waterproof seal structure may be not provided at the connection between the first half housing 101 and the second half housing 102. A waterproof seal structure in this embodiment is arranged in an inner cavity of the housing 10. Specifically, the handheld high-pressure cleaner 1 further includes a waterproof sealed box body 7. The waterproof sealed box body 7 is accommodated in the housing 10. All tool electrical devices in the housing 10 are both accommodated in the waterproof sealed box body 7. Specifically, the motor 111, the control board 12, and an electrical conduction member electrically connecting these devices are all accommodated in the waterproof sealed box body 7, to prevent water from contacting the tool electrical device in the housing 10.

Further, the switch 105 accommodated in the housing 10 may be configured to control the motor 111 to work. In a possible implementation, the switch 105 is a key switch, and includes a button 1051 to be pressed. When the handheld high-pressure cleaner 1 needs to be turned on, the button 1051 may be operably pressed to enter a started state. In this case, the motor 111 rotates to provide power. When the handheld high-pressure cleaner 1 needs to be turned off, the button 1051 may be operably pressed to a released state. At this time, the motor 111 can stop rotation within a preset time. In this implementation, to facilitate that the button 1051 on the switch 105 may be operably pressed or released, the switch 105 is not disposed in the waterproof sealed box body 7. To prevent water from entering the housing 10 through a gap where the first half housing 101 and the second half housing 102 are combined to affect the use of the switch 105, in this implementation, the switch 105 may be a waterproof switch.

Certainly, the switch 105, the motor 111, the control board 12, and an electrical conduction member electrically connected between the foregoing electrical devices may all be located in the waterproof sealed box body 7. In this implementation, the switch 105 is a sensing switch. When an operator needs to turn on the handheld high-pressure cleaner 1, the operator presses the trigger 13. At this time, the sensing switch can sense a pressing force from the operator, so as to control the sensing switch to enter a started state.

In this implementation, the tool electrical device accommodated in the housing 10 is directly placed in the waterproof sealed box body 7 to prevent water from entering the accommodating cavity 106 of the housing 10, resulting in water on the surface of the tool electrical device in the housing 10.

Figure 16:
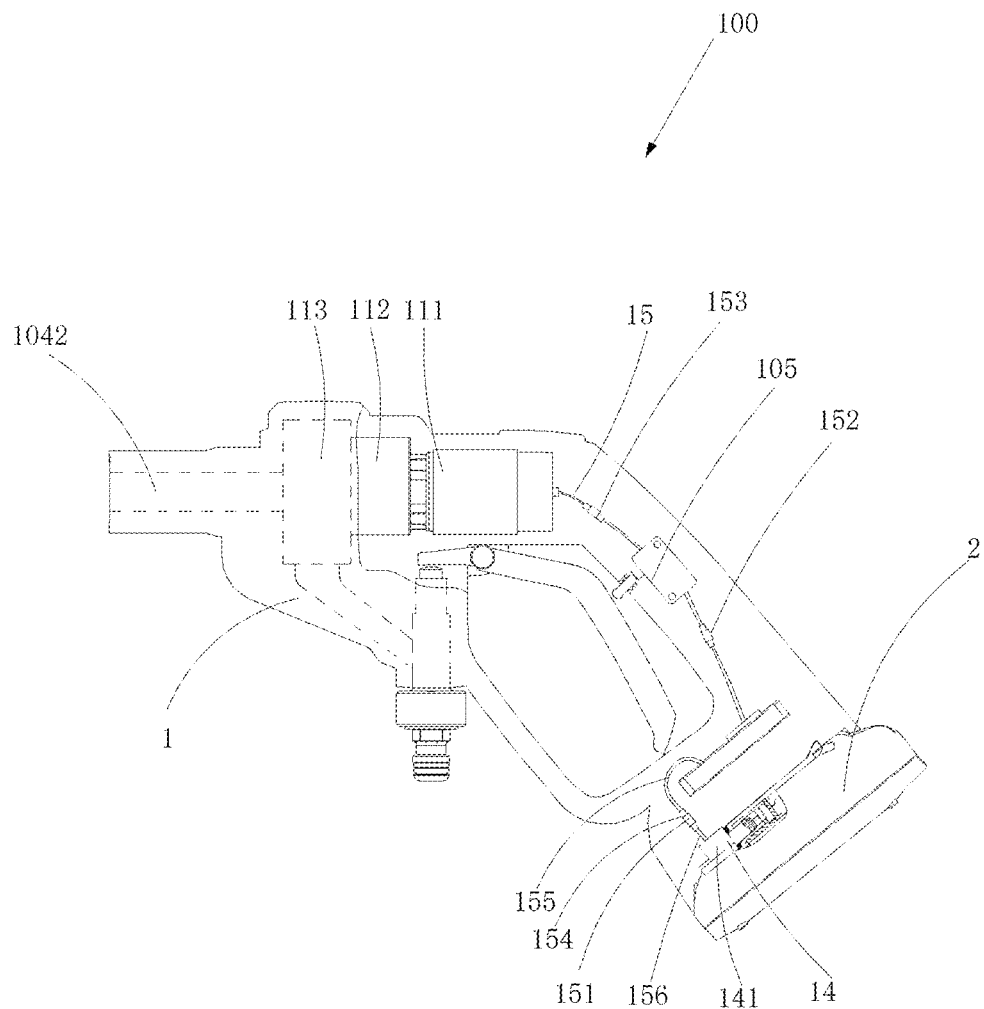
FIG. 16 is a schematic view of a third implementation of waterproofing a tool electrical device in a housing of a handheld high-pressure cleaner according to the present invention.

In the third implementation of waterproofing the tool electrical device in the housing 10 in this embodiment of the present disclosure, as shown in FIG. 16, in the implementation, a waterproof seal structure may be not provided at a joint between the first half housing 101 and the second half housing 102 of the housing 10. A wrapping layer is provided on a circumferential surface of the control board 12 accommodated in the housing 10. The wrapping layer may be implemented in an encapsulated form. Further, in this implementation, the switch 105 is a waterproof switch. The motor 111 is a high heat dissipation waterproof motor. In addition, in this implementation, the handheld high-pressure cleaner 1 further includes electrical conduction member electrically connected to the foregoing electrical devices. Specifically, the electrical conduction member is several cable components 15. The cable components 15 include a first cable component 151 that electrically connects the tool terminal connector 14 to the control board 12, a second cable component 152 that electrically connects the waterproof switch 105 to the control board 12, and a third cable component 153 that electrically connects the high heat dissipation motor 111 to the waterproof switch 105. Each cable component 15 includes a waterproof connector member 154, a first cable 155 electrically connected to one end of the waterproof connector member 154, and a second cable 156 electrically connected to the other end of the waterproof connector member 154. The two cables are respectively electrically connected to corresponding tool electrical devices. In this implementation, the cable components 15 may be disposed to electrically connect the two electrical devices without detaching the electrical devices. It is further ensured that waterproofing effects of corresponding electrical devices are not damaged.

In the three waterproofing embodiments of the tool electrical devices in the housing, the position of the battery pack 2 has two different arrangement manners.

In the first arrangement manner of the battery pack, as shown in FIG. 13 to FIG. 16, the battery pack 2 is completely accommodated in the housing 10. In other words, the battery pack 2 is nondetachably connected to the housing 10.

At this time, in one case, only the manner provided in the foregoing first implementation of waterproofing the housing 10 is used. To be specific, the joint gap between the two half housings is sealed and the fitting gap between the water outlet pipe 110 and the housing 10 is sealed, so that the battery pack 2 and the housing 10 can be waterproofed.

In another case, only the manner provided in the second implementation of waterproofing using the housing 10 is used. To be specific, the tool electrical device accommodated in the housing and the battery pack 2 are accommodated in the waterproof sealed box body 7 together. Specifically, the motor 111, the control board 12, the battery pack 2, and the electrical device electrically connected between the foregoing electrical conduction members are all accommodated in the waterproof sealed box body 7. It should be noted that similar to the second implementation of waterproofing the housing 10, it may be selected, according to the type of the switch 105, whether to arrange the switch 105 in the waterproof sealed box body 7. The position of the battery pack 2 is changed, so that the battery pack 2 and the housing 10 are waterproofed and sealed by using only one step. It is not necessary to additionally arrange a waterproof structure for the battery pack 2, so that the waterproof structure is simpler. It should be noted that in the implementation in which the battery pack 2 is embedded in the housing 10, the battery pack may be understood as a built-in battery.

Figure 15:
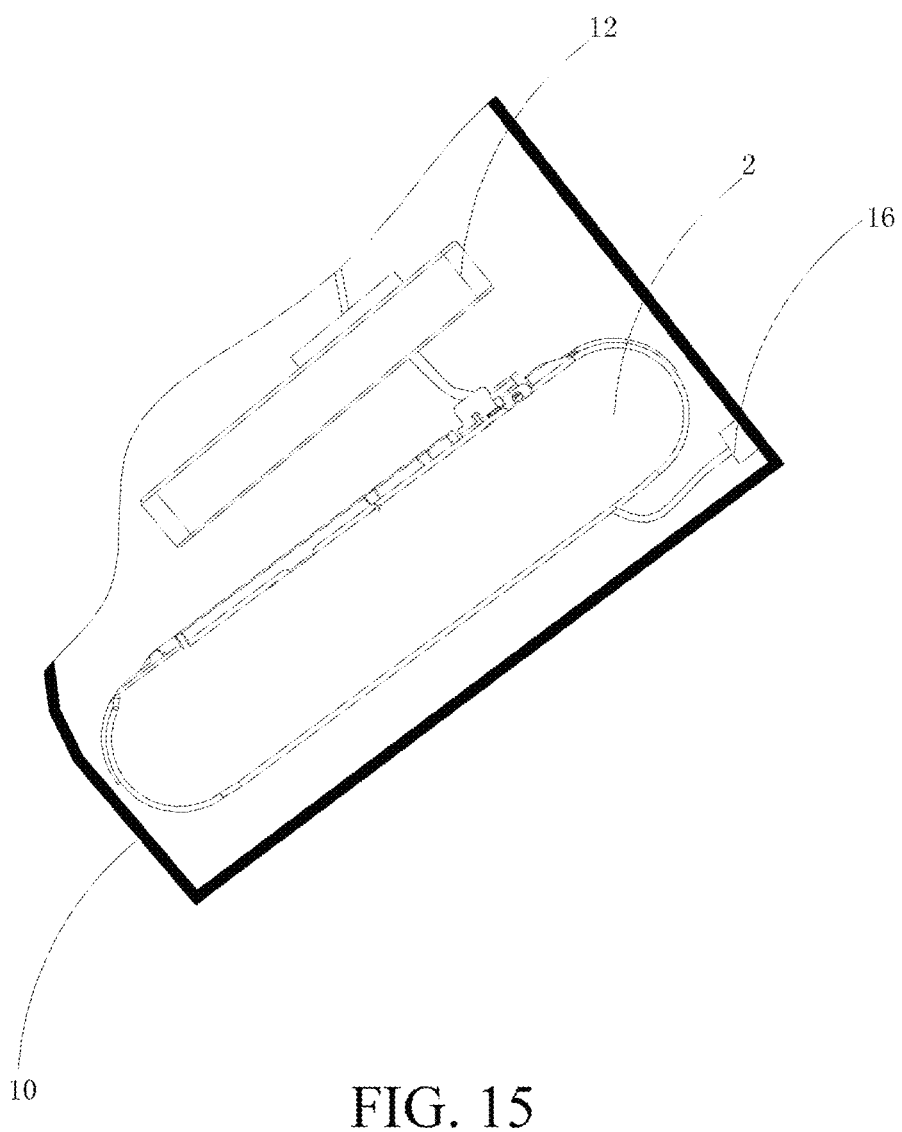
FIG. 15 is a partial schematic view of a charging manner in which a battery pack is built in the housing.

In addition, the battery pack 2 is accommodated in the housing 10. Therefore, how to charge the battery pack 2 further needs to be considered. Two solutions are provided in the present invention. In one solution, as shown in FIG. 15, a waterproof charging interface 16 electrically connected to the battery pack 2 is disposed on the housing 10. The charging interface 16 is used to charge the battery pack. In another solution, as shown in FIG. 14, the battery pack 2 further includes a wireless charging component (not shown) accommodated in the mounting cavity 20. The handheld high-pressure cleaner 1 further includes a wireless charger 17. It should be noted that the wireless charger 17 may be used as a part of the handheld high-pressure cleaner 1 or may be used as an accessory. When the handheld high-pressure cleaner 1 is placed on the wireless charger 17, the wireless charger 17 may be inductively coupled to the wireless charging component of the battery pack 2, so as to wirelessly charge the battery pack 2.

Figure 17:
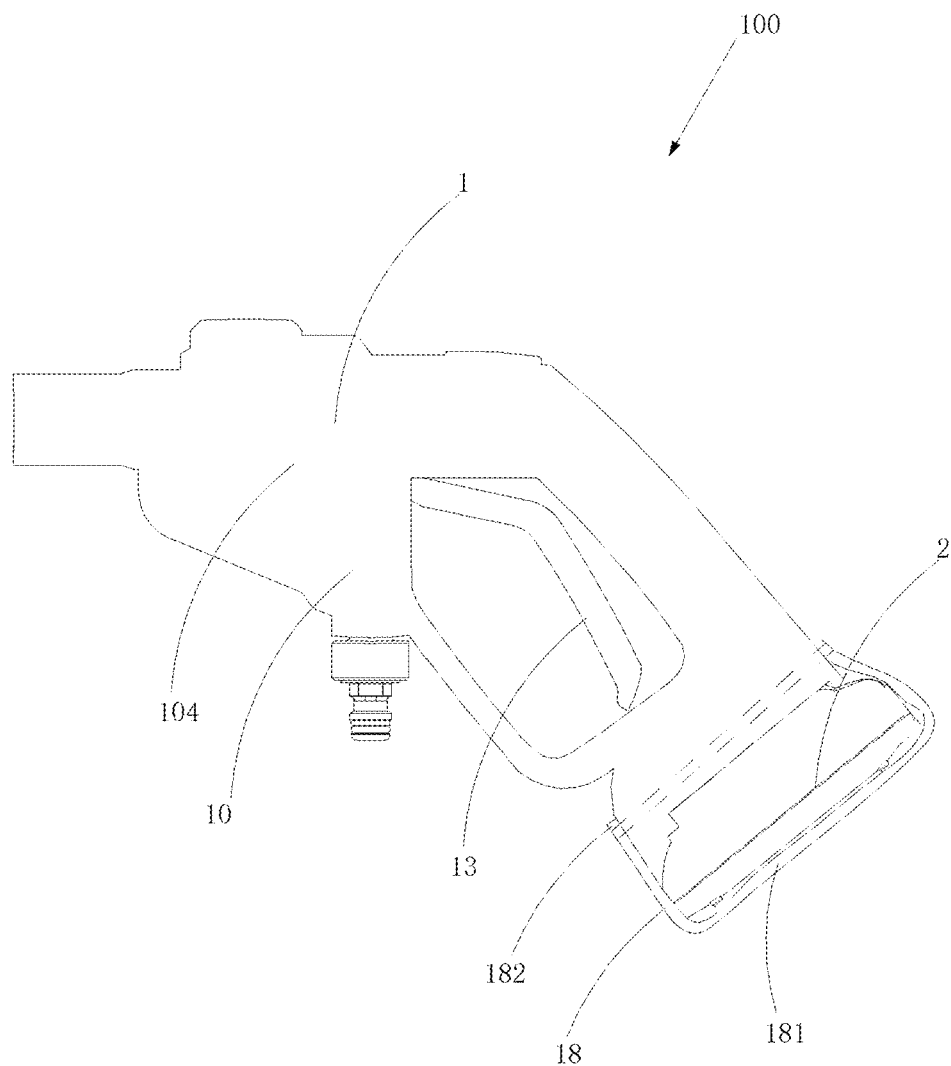
FIG. 17 is a schematic view of the third implementation of waterproofing a battery pack in a condition in which all electrical devices in a handheld high-pressure cleaner assembly need to be waterproofed according to the present invention.

In the second arrangement manner of the battery pack 2, as shown in FIG. 10, FIG. 11, and FIG. 17, the battery pack 2 is detachably connected to the housing 10. That is, it may be understood that the battery pack 2 is disposed externally. In this case, the charged body on the battery pack 2 further needs to be waterproofed and sealed, to ensure that the tool electrical device in the housing 10 and the charged body on the battery pack 2 do not contact water.

The manner of waterproofing the charged body on the battery pack 2 in this embodiment when the working water pressure at which the handheld high-pressure cleaner 1 sprays water is greater than 2.5 Mpa and the voltage of the battery pack 2 detachably connected to the handheld high-pressure cleaner 1 is greater than 42.4 V is introduced below.

In the first implementation of waterproofing the charged body on the battery pack 2 in this embodiment of the present disclosure, first, the battery pack cover 21 and the battery pack base 22 of the battery pack 2 provided in this embodiment of the present disclosure are separate structures. The battery pack cover 21 and the battery pack base 22 are tightly connected through a screw (not shown). When a screw is used for tight connection, an assembly gap inevitably exists at the connection between the battery pack cover 21 and the battery pack base 22. External water can flow into the mounting cavity 20 of the battery pack 2 through the assembly gap. As a result, there is water on two electrode terminals of each cell 231 and/or there is residual water between the cell groups 23 to cause short circuits in the circuits in the battery pack 2, leading to safety hazards such as electrical leakage, electric shocks or even cell explosions. Therefore, in this implementation, the connection between the battery pack cover 21 and the battery pack base 22 needs to be waterproofed and sealed. For details, refer to the solutions (as shown in FIG. 4) of waterproofing and sealing the battery pack cover 21 and the battery pack base 22 in the fourth implementation waterproofing of the battery pack 2 when the working water pressure at which the handheld high-pressure cleaner 1 sprays water is less than 2.5 Mpa and the voltage of the battery pack 2 coupled to the handheld high-pressure cleaner 1 is less than 42.4 V and when the working water pressure at which the handheld high-pressure cleaner 1 sprays water is greater than 2.5 Mpa, and the voltage of the battery pack 2 coupled to the handheld high-pressure cleaner 1 is less than 42.4 V. Details are not described herein one by one.

Further, for the solution of waterproofing and sealing the locking apparatus 26 on the battery pack 2, refer to the foregoing solution (as shown in FIG. 12) of waterproofing and sealing the locking apparatus 26 in the fourth implementation of waterproofing the battery pack 2. Details are not described herein one by one.

In addition, when the battery pack 2 is coupled to the handheld high-pressure cleaner 1, a fitting gap is provided between the handheld high-pressure cleaner 1 and the battery pack 2. To prevent the battery pack terminals 251 and the housing terminals 142 that are accommodated in the mounting cavity 20 from contacting external water, in this embodiment, as shown in FIG. 9 and FIG. 10, at least one of the handheld high-pressure cleaner 1 and the battery pack 2 is configured with a socket seal member 270 blocking a passage from the fitting gap to the socket 27. The socket seal member 270 can isolate the battery pack terminals 251 and the housing terminals 142 from the outside to inhibit external water from flowing onto the battery pack terminals 251 and the housing terminals 142 through the fitting gap. Specifically, the socket seal member 270 is connected between the tool terminal connector 14 and the fitting surface 211 of the battery pack 2. Regarding the connection of the socket seal member 270, in a possible implementation, the socket seal member 270 is connected to the tool terminal connector. Specifically, as shown in FIG. 9, the socket seal member 270 at least partially fixedly fits the butting surface 140 through a bonding agent. When the battery pack 2 is mounted on the handheld high-pressure cleaner 1, the socket seal member 270 is constructed to abut the fitting surface 211 of the battery pack 2 and isolate the battery pack terminals 251 and the housing terminals 142 from the outside, to inhibit external water from entering the mounting cavity 20 of the battery pack 2 through the socket 27. The socket seal member 270 may be connected to the butting surface 140 through the bonding agent or may be connected to the butting surface 140 by using a fastening member (not shown) or in any other feasible manner. The socket seal member 270 may be an elastically deformable block-shaped soft pad made of a waterproof insulation material. The block-shaped soft pad includes a plurality of through holes (not shown). These holes are configured with a structure that does not inhibit the block-shaped soft pad from isolating the socket for the housing terminals 142 to pass through correspondingly. Certainly, the socket seal member 270 may be alternatively an integrally formed strip-shaped seal ring (not shown). The seal ring is annularly disposed on the butting surface 140. After the battery pack 2 is coupled to the handheld high-pressure cleaner 1, the socket 27 is located in a sealed space defined by the strip-shaped seal ring.

Certainly, the socket seal member 270 may be alternatively movably disposed on the tool terminal connector 14. The process of coupling the battery pack 2 to the handheld high-pressure cleaner 1 can cause a change to a distance between the socket seal member 270 and the butting surface 140 of the tool terminal connector 14. At least one distance can prevent external water from entering the mounting cavity 20 through the socket 27. The movable arrangement herein may be understood as that the socket seal member 270 and the tool terminal connector 14 are not fixedly disposed, and the socket seal member 270 is detachable.

Regarding the connection of the socket seal member 270, in another feasible implementation, the socket seal member 270 is connected to the fitting surface 211 of the battery pack 2. When the battery pack 2 is mounted on the handheld high-pressure cleaner 1, the socket seal member 270 inhibits external water from entering the mounting cavity 20 of the battery pack 2 through the socket 27.

In the second implementation of waterproofing the charged body on the battery pack 2 in this embodiment of the present disclosure, the battery pack 2 includes a waterproof structure 8 that completely wraps the charged body (in addition to the battery terminal connector 25) in the mounting cavity 20 of the battery pack 2. Specifically, the cell group 23, the battery pack control board 24, and an electrical conduction member that electrically connects the cell group 23 and the battery pack control board 24 are all wrapped by the waterproof structure 8. Further specifically, the waterproof structure 8 is an independent overall structure. That is, all the charged bodies are wrapped together by the waterproof structure 8. Certainly, the independent air-permeable structure may be alternatively separate structures. The charged body located in the battery pack 2 may be alternatively separately wrapped.

Figure 7:
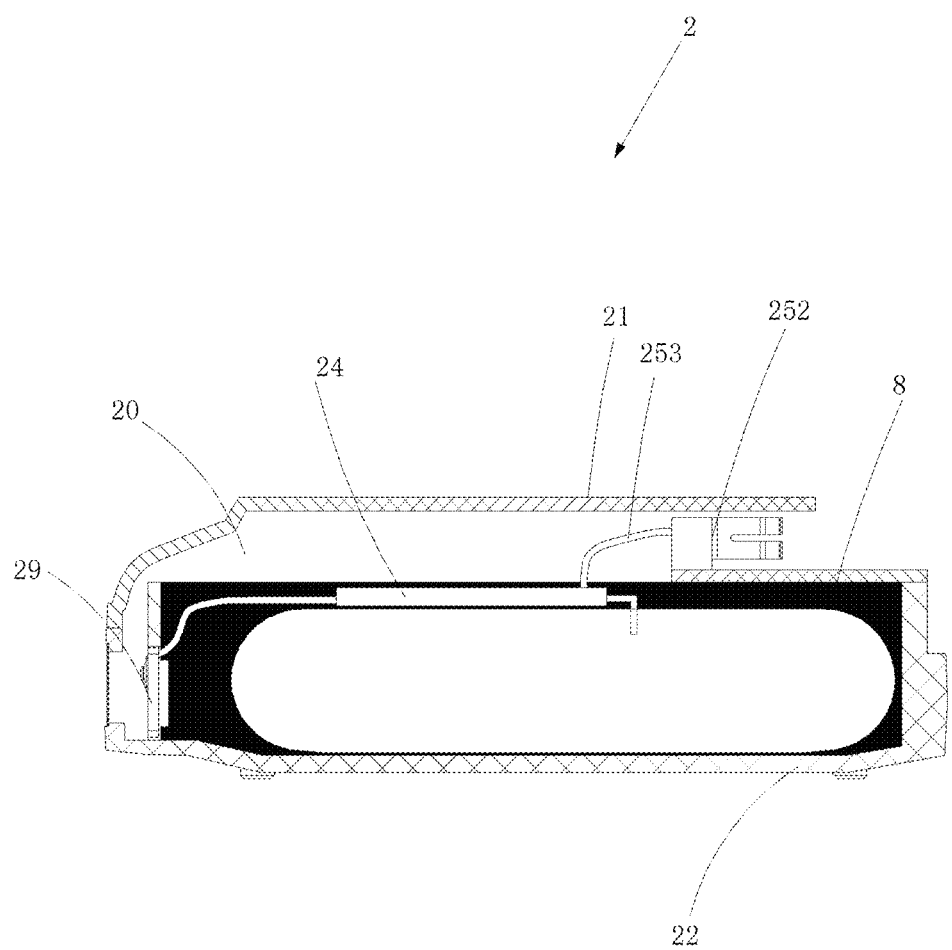
FIG. 7 is a sectional view of a solution of a battery pack in the second implementation of waterproofing a battery pack in a condition in which all electrical devices in a handheld high-pressure cleaner assembly need to be waterproofed according to the present invention.

In a feasible implementation, as shown in FIG. 7, the waterproof structure 8 is an encapsulated adhesive formed through encapsulation. In another feasible implementation, as shown in FIG. 8, the waterproof structure 8 is a sealed case accommodated in the mounting cavity 2. The sealed case is made of a waterproof material. Specifically, each charged body is respectively configured with a sealed case. For example, the cell group 23 is accommodated in cell case 81, the battery pack control board 24 is accommodated in a control board case 82, and the display apparatus 29 is accommodated in a display apparatus case 83. Certainly, the sealed case may be alternatively an independent case.

In addition, when the battery pack 2 is coupled to the handheld high-pressure cleaner 1, a fitting gap is provided between the handheld high-pressure cleaner 1 and the battery pack 2. To prevent the battery terminal connector 25 from contacting external water, in this embodiment, at least one of the handheld high-pressure cleaner 1 and the battery pack 2 is configured with the socket seal member 270 blocking a passage from the fitting gap to the socket 27. The socket seal member 270 can isolate the battery pack terminals 251 from the outside to inhibit external water from flowing onto the battery pack terminals 251 through the fitting gap. For a specific implementation solution, the socket seal member 270, refer to the introduction in the first implementation of waterproofing the charged body on the battery pack 2 when the working water pressure at which the handheld high-pressure cleaner 1 sprays water is greater than 2.5 Mpa and the voltage of the battery pack 2 detachably connected to the handheld high-pressure cleaner 1 is greater than 42.4 V. Details are not described herein again.

In the third implementation of waterproofing the charged body on the battery pack 2 in this embodiment of the present disclosure, to enable the battery pack 2 to be compatible with various other electric tools and satisfy waterproofing requirements of the handheld high-pressure cleaner 1 without changing the structure of the battery pack 2, as shown in FIG. 17, in this implementation, either the handheld high-pressure cleaner 1 or the battery pack 2 may be connected to a hollow waterproof casing 18. The waterproof casing 18 includes a bag body portion 181 wrapped around the battery pack 2 and a bag opening portion 182 for the battery pack 2 to pass through. The circumference of the bag opening portion 182 is pressed against the housing 10 to form a seal with the housing 10. When the battery pack 2 and the handheld high-pressure cleaner 1 are inserted to fit, the waterproof casing 18 is connected to the housing 10 and forms a sealed space with the housing 10. The battery pack 2 is accommodated in the sealed space. The arrangement of the waterproof casing 18 herein may be understood as making the battery pack 2 wear a waterproof boot. In this case, in one aspect, it is only necessary to waterproof and seal the housing 10 of the high-pressure cleaner 1, and it is not necessary to additionally arrange a waterproof structure for the battery pack 2. The high-pressure cleaner 1 is also waterproofed and sealed by using only one step. The waterproof structure is simpler. In another aspect, the battery pack 2 is compatible with other electric tools without making any change to the structure of the battery pack 2.

Further, in both the first and second implementations of waterproofing corresponding electrical devices accommodated in the housing 10 of the high-pressure cleaner 1, the corresponding electrical devices are placed in a sealed space. To ensure that heat dissipation requirements of the motor 111 are satisfied, three implementations are provided for the heat dissipation of the motor 111 in the present invention.

Figure 18:
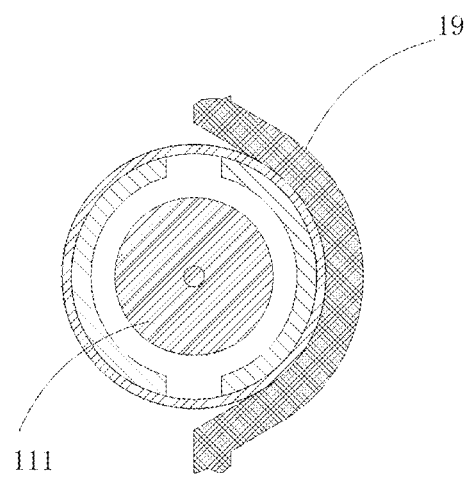
FIG. 18 is a sectional view of the handheld high-pressure cleaner in FIG. 14 in a direction A-A, and is a schematic view of a first implementation of heat dissipation of the housing of the handheld high-pressure cleaner.

In the first possible implementation of the heat dissipation of the motor 111, as shown in FIG. 18, the handheld high-pressure cleaner 1 further includes a heat dissipation pad 19 wrapped around the motor 111. The heat dissipation pad 19 is held between the motor 111 and the housing 10 to facilitate transfer of the heat of the motor 111 to the housing 10 through the heat dissipation pad 19. Preferably, the entire housing 10 or at least a part of the housing 10 in an area corresponding to the motor 111 is made of a high heat dissipation material. Specifically, the high heat dissipation material may be aluminum. The benefit of such a design is that the motor 111 rapidly cooled, so that the motor 111 is kept from being burned out, thereby extending the service life of the motor 111.

Figure 19:
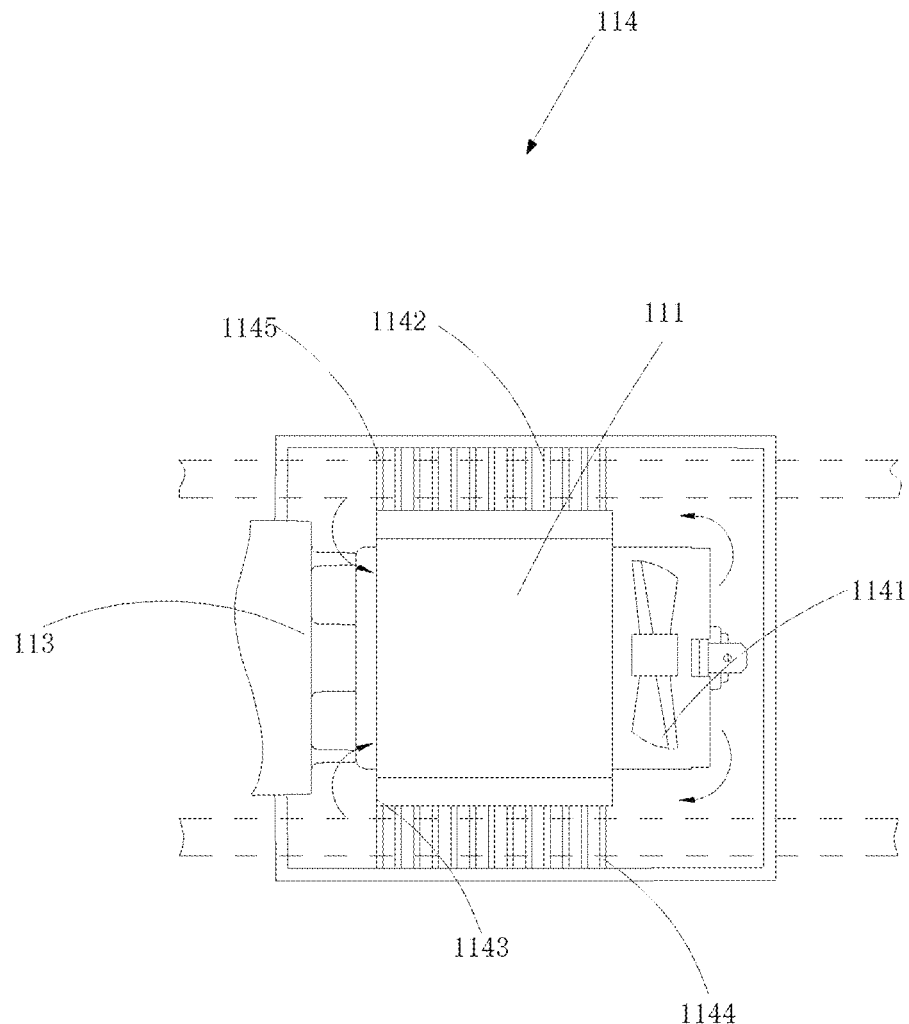
FIG. 19 is a schematic view of a second implementation of heat dissipation of the housing of the handheld high-pressure cleaner.

In the second possible implementation of the heat dissipation of the motor 111, as shown in FIG. 19, the high-pressure cleaner 1 includes a first heat dissipation system 114 configured around the motor 111. The first heat dissipation system 114 includes a fan 1141 that can rotate to generate an air flow, a heat dissipation pipe 1142, and a support bracket 1143 for supporting the heat dissipation pipe 1142 around the motor 111. The fan 1141 may be alternatively a structure that belongs to the motor 111. Preferably, the heat dissipation pipe 1142 is spiral, and is disposed around the motor 111 in a circumferential direction. In this implementation, the heat dissipation pipe 1142 is disposed at a gap from the motor 111 by using the support bracket 1143. The heat dissipation pipe 1142 includes a first pipe opening 1144 in communication with a water inlet 1041 of the handheld high-pressure cleaner 1 and a second pipe opening 1145 in communication with the water inlet of the pump 113. External water flows into the heat dissipation pipe 1142 through the water inlet 1041, and the second pipe opening 1145 from the heat dissipation pipe 1142 flows out into the pump 113. When the handheld high-pressure cleaner 1 is in a working state, the motor 111 drives the fan 1141 to rotate, and the heat of the motor 111 is transferred to the heat dissipation pipe 1142 through an air flow generated from the rotation of the fan 1141. The water flow keeps flowing between the first pipe opening 1144 and the second pipe opening 1145 of the heat dissipation pipe 1142, to ensure continuous heat dissipation for the motor 111 when the handheld high-pressure cleaner is in a working state. Certainly, the heat dissipation pipe 1142 may be alternatively not disposed to be spiral. Instead, several heat dissipation pipes 1142 may be configured around the motor in a circumferential direction. The heat dissipation pipes 1142 may be in communication with each other or may be not in communication with each other. It is only necessary to ensure that a pipe opening at one end of each heat dissipation pipe 1142 is in communication with the water inlet 1041 of the handheld high-pressure cleaner 1, and a pipe opening at the other end of each heat dissipation pipe 1142 is in communication with the water inlet of the pump 113 of the high-pressure cleaner 1. In other words, it is ensured that water in the heat dissipation pipe 1142 is continuously flowing cooling water. Further, alternatively, more than one pipe opening may be in communication with the water inlet 1041 of the handheld high-pressure cleaner 1. Further, to ensure that the cooling water in the heat dissipation pipe 1142 can take away the heat of the motor 111 to implement fast heat dissipation, a linear distance between the heat dissipation pipe 1142 and the motor 111 is not greater than 20 centimeters.

Figure 20:
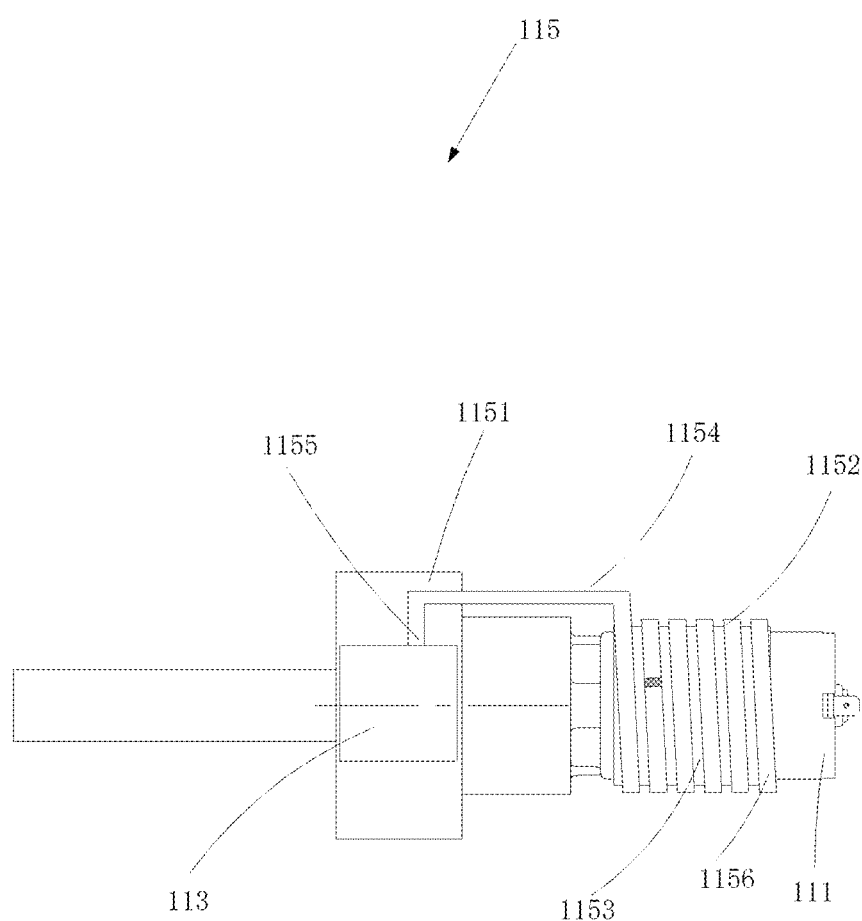
FIG. 20 is a schematic view of a third implementation of heat dissipation of the housing of the handheld high-pressure cleaner.

In the third possible implementation of the heat dissipation of the motor 111, as shown in FIG. 20, the handheld high-pressure cleaner 1 includes a second heat dissipation system 115 configured around the motor 111. The second heat dissipation system 115 includes a heat sink 1151 connected to the pump 113 and a condensation pipe 1152 connected to the heat sink 1151. The condensation pipe 1152 includes a first condensation pipe 1153 wound around an outer surface of the motor 111 and a second condensation pipe 1154 connected between the first condensation pipe 1153 and the heat sink 1151. In this implementation, to ensure optimal effects of thermal conduction and heat dissipation, the first condensation pipe 1153 directly contacts the outer surface of the motor 111, and the heat sink 1151 also directly contacts an outer surface of the pump 113. It may be understood as that the first condensation pipe 1153 is attached around the motor 111, and the heat sink 1151 is attached around the pump 113. Preferably, the first condensation pipe 1153 is spiral. To increase a contact surface between the first condensation pipe 1153 and the motor 111 to better guide out the heat of the motor 111, in this implementation, the cross section of the condensation pipe 1152 is a rectangle. The principles of thermal conduction and heat dissipation of the condensation pipe 1152 are introduced below in detail. Further, the condensation pipe 1152 includes a hollow inner cavity (not shown), a porous capillary core layer (not shown) tight bonded to the wall of the inner cavity, and a working liquid that is located in the inner cavity and can fill the porous capillary core layer. The inner cavity may be operably set to a negative pressure. One end, near the heat sink 1151, of the condensation pipe 1152 is configured as a cooled end 1155, and the other end, near the motor 111, of the condensation pipe 1152 is configured as an evaporation end 1156. When the motor 111 is in a started state, the evaporation end 1156 is heated. The working liquid in the porous capillary core layer evaporates and vaporizes. Under a slight pressure difference, the vapor flows to the cooled end 1155, and releases heat at the cooled end 1155 to condense into a cooled liquid. The cooled liquid then flows back to the evaporation end 1156 along the porous capillary core layer. This cycle is repeated to continuously transfer the heat of the motor 111 from the evaporation end 1156 to the cooled end 1155 to implement continuous heat dissipation of the motor 111.

Figure 21:
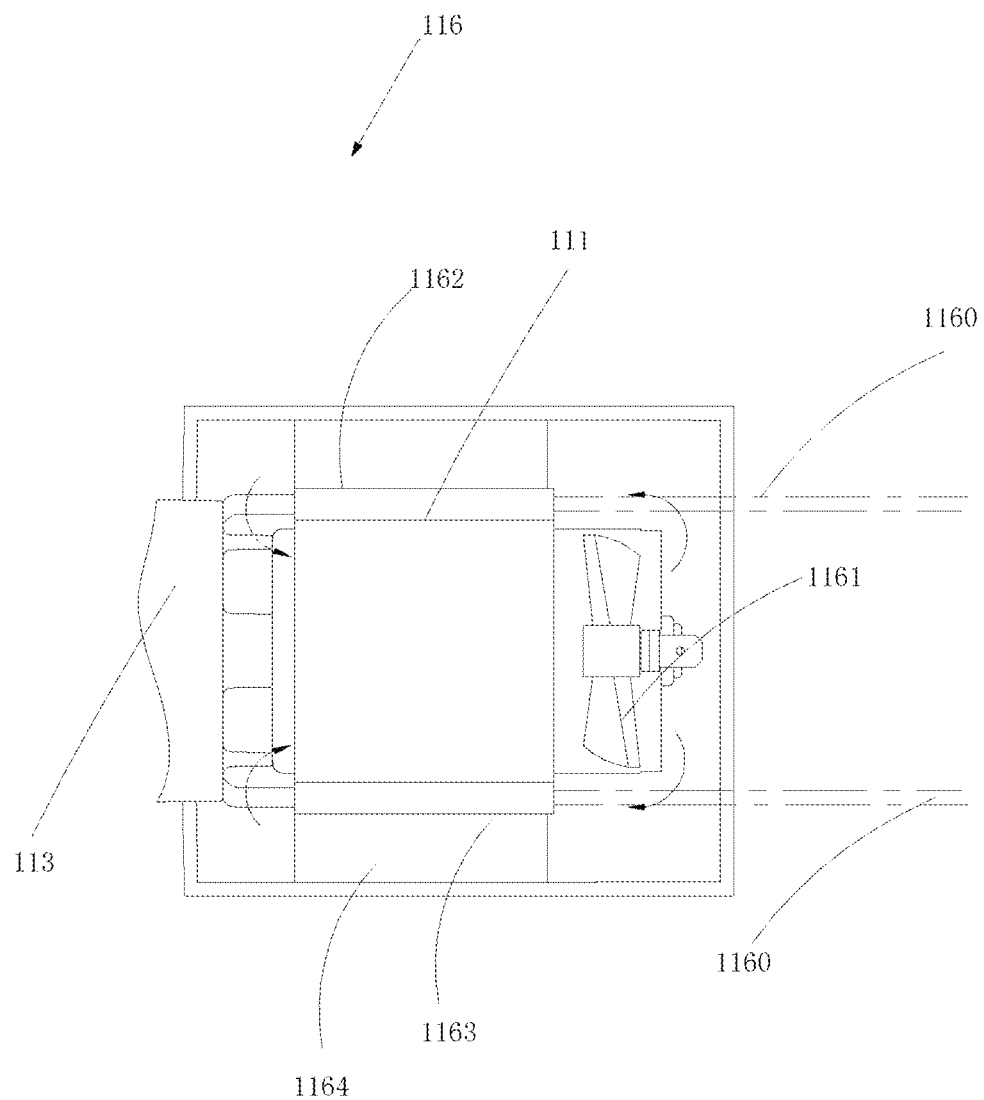
FIG. 21 is a schematic view of a fourth implementation of heat dissipation of the housing of the handheld high-pressure cleaner.

In the fourth possible implementation of the heat dissipation of the motor 111, as shown in FIG. 21, the high-pressure cleaner 1 includes a third heat dissipation system 116 configured around the motor 111. The third heat dissipation system 116 includes a fan 1161 that can rotate to generate an air flow, a heat sink component 1162, and a water pipe branch 1160 connected to the heat sink component. The fan 1161 may be alternatively a structure that belongs to the motor 111. The heat sink component 1162 includes a support member 1163 and several heat sinks 1164 connected to the support member 1163. In this implementation, two water pipe branches are provided. The two water pipe branches may be symmetrically disposed at 180 degrees. The two water pipe branches are inserted on the support member. One end of each pipe branch is in communication with and connected to the water inlet 1041. The other end of each pipe branch is in communication with and connected to the inner cavity of the pump. A cooled water flow continuously flows in each pipe branch to ensure that the temperature of the heat sink component is reduced. When the high-pressure cleaner 1 is in a working state, the motor 111 drives the fan 1161 to rotate, and the heat of the motor 111 is transferred to the heat sink component 1162 through an air flow generated from the rotation of the fan 1161 to implement the heat dissipation of the motor 111.

The foregoing embodiments only describe several implementation manners of the present invention, and their description is specific and detailed, but cannot therefore be understood as a limitation to the patent scope of the present invention. It should be noted that a person of ordinary skill in the art may further make several variations and improvements without departing from the conception of the present invention, and these all fall within the protection scope of the present invention.

What is claimed is:

1. A battery pack, detachably coupled to an electric tool provided with housing terminals, the battery pack comprising:
a battery pack cover;
a battery pack base, joined to the battery pack cover to form a battery pack housing;
a cell group, configured to be charged and discharged, the cell group comprising several cells, and each cell being provided with a cell body portion, a first electrode terminal located on one side of the cell body portion, and a second electrode terminal located on the other side of the cell body portion;
a battery terminal connector, electrically connected to the cell group, the battery terminal connector comprising battery pack terminals electrically connectable to the housing terminals and a terminal base supporting the battery pack terminals;
a mounting cavity, defined in the battery pack housing, and accommodating the cell group and the battery terminal connector, the mounting cavity being formed with a socket for inserting the housing terminals to be electrically connected to the battery pack terminals; and
a lock configured to drive the battery pack and the electric tool to be in locked connection or released,
wherein a seal member blocking a passage from the socket to the cell group is disposed inside the mounting cavity,
wherein the battery pack further comprises a battery pack housing seal member blocking communication between the outside and the mounting cavity, and the battery pack housing seal member is disposed at a joint between the battery pack cover and the battery pack base,
wherein the seal member and battery pack housing seal member form waterproof seals,
wherein the lock is mounted on the battery pack housing, and the lock is isolated outside the mounting cavity, and
wherein the terminal base is constructed to be a waterproof box body, the waterproof box body is provided, in a direction facing the socket, with an opening for the housing terminals to pass through, and the seal member is sealed between an inner wall of the battery pack and the waterproof box body, to close an assembly gap between the waterproof box body and the inner wall of the battery pack.

2. The battery pack according to claim 1, wherein the seal member is tightly pressed between the socket and the terminal base.

3. The battery pack according to claim 2, wherein a thickness of the seal member in a free state is greater than a gap between the terminal base and the socket.

4. The battery pack according to claim 1, wherein the socket is attached with the seal member, the seal member attached to the socket is disposed on an inner wall of the battery pack, the seal member is provided with a through hole, and the through hole is configured to have a structure that does not prevent the seal member from isolating the socket from the cell group for the housing terminal to pass through.

5. The battery pack according to claim 4, wherein the seal member and the battery terminal connector that are located in the mounting cavity are disposed opposite each other.

6. The battery pack according to claim 1, wherein the lock is detachably mounted on the battery pack cover and is movable relative to the battery pack cover, capable of driving the battery pack and the electric tool to be in locked connection or released, the battery pack housing is provided with a retaining cavity that is concave in an outer surface of the battery pack housing and at least partially surrounds the lock, the retaining cavity forms a movement space for the lock to move, and the retaining cavity and the mounting cavity are not in communication with each other.

7. The battery pack according to claim 1, wherein the battery pack comprises an isolation member detachably connected to the battery pack housing and an isolation seal structure located between the isolation member and the battery pack housing, and the isolation member is concavely provided with a retaining cavity for accommodating the lock.

8. An electric tool assembly, comprising the battery pack according to claim 1 and an electric tool detachably connected to the battery pack, the electric tool comprising:
   a housing;
   a tool terminal connector, connected to the housing, the tool terminal connector comprising housing terminals and a base supporting the housing terminals; and
   a functional member, having a motor providing a driving force to the electric tool.

9. The electric tool assembly according to claim 8, wherein the electric tool is a high-pressure cleaner, and the housing comprises a handle for holding, a body portion disposed at an angle from the handle, a water inlet connected to an external water source, and a water outlet for discharging water.

10. The electric tool assembly according to claim 9, wherein the body portion is disposed at one end of the handle, and the battery pack is disposed at the other end of the handle.

11. The electric tool assembly according to claim 8, wherein the functional member comprises a pump driven by the motor to discharge water, and the functional member is disposed in the housing.

12. The electric tool assembly according to claim 9, wherein a working water pressure at which the high-pressure cleaner discharges water is 0.3 Mpa to 5 Mpa.

13. The electric tool assembly according to claim 8, wherein one or more battery packs are configured, and a voltage of each battery pack is 18 V to 42 V.

14. An electric tool assembly, comprising a battery pack and an electric tool detachably connected to the battery pack, the electric tool comprising:
   a housing;
   a tool terminal connector, connected to the housing, the tool terminal connector comprising housing terminals and a base supporting the housing terminals; and
   a functional member, having a motor providing a driving force to the electric tool;
   wherein the battery pack comprises:
      a battery pack cover;
      a battery pack base, joined to the battery pack cover to form a battery pack housing;
      a cell group, configured to charged and discharged, the cell group comprising several cells, and each cell being provided with a cell body portion, a first electrode terminal located on one side of the cell body portion, and a second electrode terminal located on the other side of the cell body portion;
      a battery terminal connector, electrically connected to the cell group, the battery terminal connector comprising battery pack terminals electrically connectable to the housing terminals and a terminal base supporting the battery pack terminals; and
      a mounting cavity, defined in the battery pack housing, and accommodating the cell group and the battery terminal connector, the mounting cavity being formed with a socket for inserting the housing terminals to be electrically connected to the battery pack terminals,
   wherein a seal member blocking a passage from the socket to the cell group is disposed inside the mounting cavity,
   wherein the battery pack further comprises a battery pack housing seal member blocking communication between the outside and the mounting cavity, and the battery pack housing seal member is disposed at a joint between the battery pack cover and the battery pack base,
   wherein the seal member and battery pack housing seal member form waterproof seals,
   wherein the electric tool further comprises a lock configured to drive the battery pack and the electric tool to be in locked connection or released, and the lock is isolated outside the mounting cavity, and
   wherein the terminal base is constructed to be a waterproof box body, the waterproof box body is provided, in a direction facing the socket, with an opening for the housing terminals to pass through, and the seal member is sealed between an inner wall of the battery pack and the waterproof box body, to close an assembly gap between the waterproof box body and the inner wall of the battery pack.

* * * * *